(12) United States Patent
Day

(10) Patent No.: US 10,360,037 B2
(45) Date of Patent: Jul. 23, 2019

(54) FETCH UNIT FOR PREDICTING TARGET FOR SUBROUTINE RETURN INSTRUCTIONS

(71) Applicant: MIPS Tech, LLC, Santa Clara, CA (US)

(72) Inventor: Philip Day, London (GB)

(73) Assignee: MIPS Tech, LLC, Campbell, CA (US)

( * ) Notice: Subject to any disclaimer, the term of this patent is extended or adjusted under 35 U.S.C. 154(b) by 61 days.

(21) Appl. No.: 15/281,661

(22) Filed: Sep. 30, 2016

(65) Prior Publication Data

US 2017/0090933 A1    Mar. 30, 2017

(30) Foreign Application Priority Data

Sep. 30, 2015 (GB) .................................. 1517321.4

(51) Int. Cl.
| | |
|---|---|
| *G06F 9/34* | (2018.01) |
| *G06F 12/02* | (2006.01) |
| *G06F 9/38* | (2018.01) |
| *G06F 9/30* | (2018.01) |
| *G06F 12/0875* | (2016.01) |

(52) U.S. Cl.
CPC .......... *G06F 9/3802* (2013.01); *G06F 9/3016* (2013.01); *G06F 9/30054* (2013.01); *G06F 9/3806* (2013.01); *G06F 9/30134* (2013.01); *G06F 9/30163* (2013.01); *G06F 9/382* (2013.01); *G06F 9/3808* (2013.01); *G06F 12/0875* (2013.01)

(58) Field of Classification Search
CPC .. G06F 9/3802; G06F 9/30054; G06F 9/3016; G06F 9/3806; G06F 9/30163; G06F 9/30134; G06F 8/20; G06F 8/433; G06F 9/3808; G06F 9/382; G06F 12/0875
USPC ................. 712/206, 207, 233–243; 717/132; 711/132
See application file for complete search history.

(56) References Cited

U.S. PATENT DOCUMENTS

| 8,341,383 | B2 * | 12/2012 | Dieffenderfer ...... G06F 9/30054 |
|---|---|---|---|
| | | | 712/243 |
| 2005/0172110 | A1 | 8/2005 | Hirotsu et al. |
| 2006/0224870 | A1 * | 10/2006 | Tago ..................... G06F 9/3804 |
| | | | 712/238 |
| 2009/0210661 | A1 | 8/2009 | Alexander et al. |

(Continued)

FOREIGN PATENT DOCUMENTS

| JP | 7-239782 A | 9/1995 |
|---|---|---|
| WO | 2014/085683 A1 | 6/2014 |

*Primary Examiner* — Daniel H Pan
(74) *Attorney, Agent, or Firm* — Adams Intellex, PLC

(57) ABSTRACT

A fetch unit configured to, in response to detecting a subroutine call and link instruction, calculate and store a predicted target address for the corresponding subroutine return instruction in a prediction stack, and if certain conditions are met, also cause to be stored in the prediction stack a predicted target instruction bundle. The fetch unit is also configured to, in response to detecting a subroutine return instruction, use the predicted target address in the prediction stack to determine the address of the next instruction bundle to be fetched, and if certain conditions are met, cause any valid predicted target instruction bundle in the prediction stack to be the next bundle to be decoded.

18 Claims, 17 Drawing Sheets

(56) References Cited

U.S. PATENT DOCUMENTS

2012/0297167 A1* 11/2012 Shah .................. G06F 9/30101
                                                                712/202
2016/0092230 A1*  3/2016 Chen ..................... G06F 9/381
                                                                712/241

* cited by examiner

FETCH UNIT FOR PREDICTING TARGET FOR SUBROUTINE RETURN INSTRUCTIONS

BACKGROUND

A program executed on a processor comprises multiple types of instructions, such as subroutine call and link instructions.

A subroutine call and link instruction is an instruction that jumps to a subroutine (a section of code to perform a specific task) at a call destination address, and, after the subroutine has been executed, returns to the calling point. In particular the last instruction of the subroutine is a return instruction which directs the processor to return to the calling point and start executing instructions. Accordingly, a subroutine can only be called by an instruction that stores a link back to the main program.

Instructions in a program can be more efficiently fetched if the fetch unit of the processor takes into account the relationship between the call and link instruction and the corresponding subroutine return instruction.

The embodiments described below are provided by way of example only and are not limiting of implementations which solve any or all of the disadvantages of known processor fetch units.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A fetch unit for efficiently fetching subroutine call and link instructions and corresponding subroutine return instructions. The fetch unit is configured to, in response to detecting a subroutine call and link instruction, calculate and store a predicted target address for the corresponding subroutine return instruction in a prediction stack, and if certain conditions are met, also cause to be stored in the prediction stack a predicted target instruction bundle. The fetch unit is also configured to, in response to detecting a subroutine return instruction, use the predicted target address in the prediction stack to determine the address of the next instruction bundle to be fetched, and if certain conditions are met, cause the predicted target instruction bundle in the prediction stack to be the next instruction bundle to be decoded.

A first aspect provides a multi-stage fetch unit for use in a processor, the multi-stage fetch unit comprising: a return prediction stack; and partial decode logic in communication with the return prediction stack, the partial decode logic configured to, in a cycle: receive a set of one or more instructions for execution; at least partially decode the received set of one or more instructions to determine whether the received set of one or more instructions comprises a subroutine call and link instruction or a subroutine return instruction; in response to determining that the received set of one or more instructions comprises a subroutine call and link instruction, cause a predicted target set of one or more instructions for a corresponding subroutine return instruction to be stored in the return prediction stack; and in response to determining that the received set of one or more instructions comprises a subroutine return instruction, cause a predicted target set of one or more instructions stored in the return prediction stack to be the received set of one or more instructions in a next cycle.

A second aspect provides a method of fetching instructions in a multi-stage fetch unit of a processor, the method comprising, in each cycle: receiving a set of one or more instructions for execution; at least partially decoding the received set of one or more instructions to determine whether the received set of one or more instructions comprises a subroutine call and link instruction or a subroutine return instruction; in response to determining that the received set of one or more instructions comprises a subroutine call and link instruction, causing a predicted target set of one or more instructions for a corresponding subroutine return instruction to be stored in a return prediction stack; and in response to determining that the received set of one or more instructions comprises a subroutine return instruction, causing a predicted target set of one or more instructions stored in the return prediction stack to be the received set of one or more instructions in a next cycle.

A third aspect provides a computer readable storage medium having encoded thereon computer readable program code defining a processor comprising the fetch unit of the first aspect.

A fourth aspect provides a computer readable storage medium having encoded thereon computer readable program code defining a processor configured to perform the method of the second aspect.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
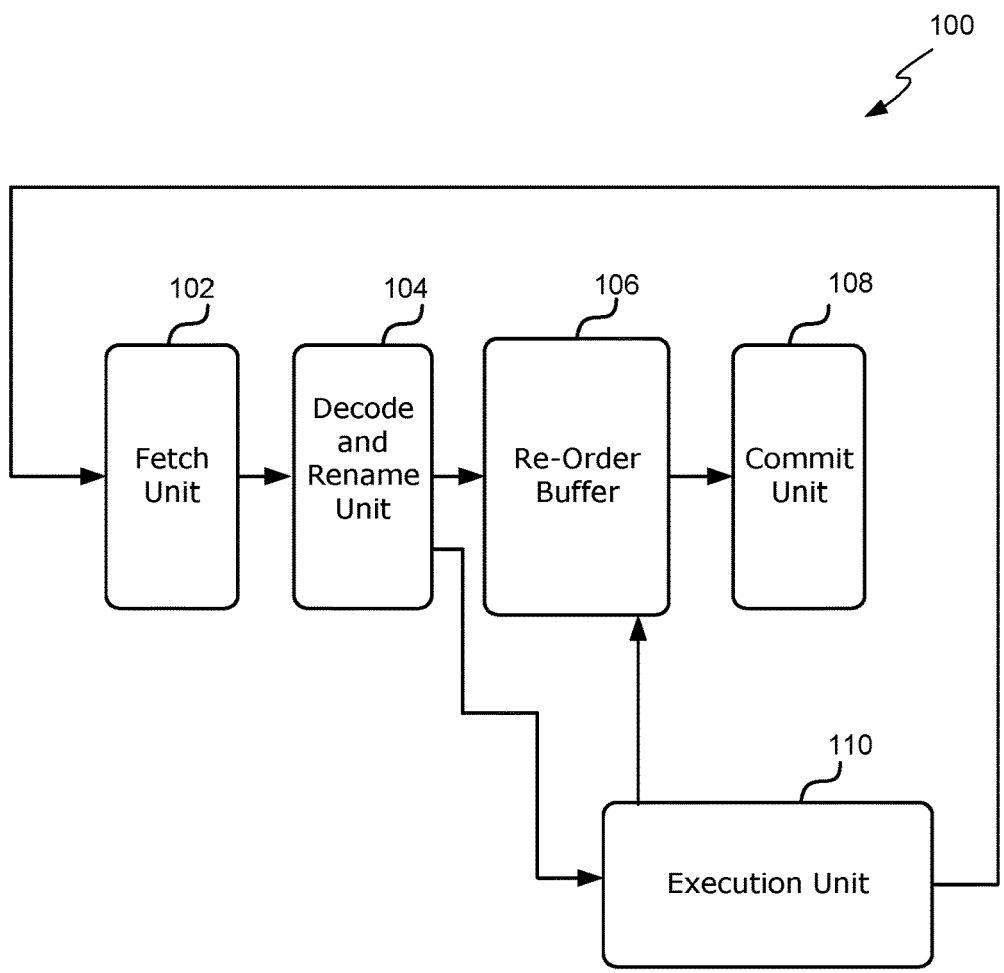
FIG. 1 is a block diagram of an example out-of-order processor.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Described herein are methods and multi-stage fetch units for predicting and storing target instruction(s) for a subroutine return instruction so that a cycle is not wasted fetching the target instruction(s) after a subroutine return instruction is detected. The fetch unit is configured to monitor fetched instructions for subroutine call and link instructions. Once a subroutine call and link instruction is detected, the predicted target address for the corresponding subroutine return instruction is stored in a buffer, and, in some cases, in the next cycle the immediately following instruction bundle is stored in the buffer in association as the predicted target instruction bundle for the corresponding subroutine return instruction. When the fetch unit subsequently detects the corresponding subroutine return instruction for the subroutine call and link instruction the predicted target address, and any predicted target instruction bundle are retrieved from the buffer so that in the next cycle the predicted target instruction bundle can be processed and the predicted target address can be used to fetch the next instruction bundle for execution.

Reference is first made to FIG. 1 which shows a schematic diagram of an example out-of-order processor 100 in which the methods and fetch units described herein may be implemented. Although FIG. 1 shows an out-of-order processor, the methods may also be implemented in a processor which does not process instructions out-of-order, i.e. in an in-order processor. In this example the processor 100 is a single-threaded processor; however the methods are also applicable to multi-threaded processors.

The processor 100 comprises a fetch unit 102, a decode and rename unit 104, a re-order buffer 106, a commit unit 108 and one or more execution units 110. However, it will be evident to a person of skill in the art that one or more of these units may be combined. For example, in other processors the decode and renaming unit 104 and the one or more execution units 110 may be combined to form a single unit.

The fetch unit 102 is configured to fetch instructions from a program (in program order) as indicated by a program counter (PC). Some fetch units 102 are configured to fetch more than one instruction in a cycle while other fetch units are configured to fetch only a single instruction in a cycle. When multiple instructions are fetched in a cycle the instructions are set to form an instruction bundle. The term "cycle" is used herein to mean a processing cycle of the processor 100. In some cases there is a processing cycle each clock cycle. However, in other cases processing cycles may occur more or less often than each clock cycle.

The fetch units discussed herein are described as fetching an instruction bundle (i.e. more than one instruction) in a cycle, however, it will be evident to a person of skill in the art that the methods and principles described herein may also be applied to fetch units that fetch only a single instruction per cycle. The term a "set of one or more instructions" is used herein to include both a single instruction and an instruction bundle comprising two or more instructions.

Once an instruction bundle is fetched the instructions contained therein are provided to the decode and rename unit 104 which is arranged to interpret the instructions and perform register renaming. In particular, each instruction may comprise a register write operation; one or more register read operations; and/or an arithmetic or logical operation. A register write operation writes to a destination register and a register read operation reads from a source register. During register renaming each architectural register referred to in an instruction (e.g. each source and destination register) is replaced (or renamed) with a physical register.

After an instruction passes through the decode and rename unit 104 it is inserted into a reorder buffer 106 (ROB) and dispatched to an execution unit 110 for execution. The execution unit 110 that the instruction is dispatched to may be based on the type of instruction.

The re-order buffer 106 is a buffer that enables the instructions to be executed out-of-order, but committed in-order. The re-order buffer 106 holds the instructions that are inserted into it in program order, but the instructions within the ROB 106 can be executed out of sequence by the execution units 110. Instructions output from the re-order buffer 106 are provided to a commit unit 108, which commits the results of the instructions to the register/memory.

Each execution unit 110 is responsible for executing instructions and may be configured to execute specific types of instructions. The execution units 110 may comprise one or more of a load-store unit, an integer unit, a floating point unit (FPU), a digital signal processing (DSP)/single instruction multiple data (SIMD) unit, or a multiply accumulate (MAC) unit. The load-store unit reads data to and writes data from the L1 cache and memory beyond that. An integer unit performs integer instructions, an FPU executes floating point instructions, a DSP/SIMD unit has multiple processing elements that perform the same operation on multiple data points simultaneously, and a MAC unit computes the product of two numbers and adds that product to an accumulator.

The processor 100 may also comprise functional elements other than those shown in FIG. 1 (e.g. caches, memory, register files, etc.). For example, the processor 100 may further comprise a branch predictor which is configured to predict which direction the program flow will take in the case of instructions known to cause possible flow changes, such as branch instructions. Branch prediction is useful as it enables instructions to be speculatively executed by the processor 100 before the outcome of the branch instruction is known. When the branch predictor predicts the program flow accurately, this improves performance of the processor 100. However, if the branch predictor does not correctly predict the branch direction, then a misprediction occurs which needs to be corrected before the program can continue. To correct a misprediction, the speculative instructions sent to the ROB 106 are abandoned, and the fetch unit 102 starts fetching instructions from the correct program branch.

It will be appreciated that other processors may not comprise all the functional elements shown in FIG. 1 (i.e. one or more of the functional elements shown in FIG. 1 may be omitted) and may, in some examples, comprise additional functional elements not shown in FIG. 1.

A program executed on a processor (e.g. processor 100) may comprises multiple types of instructions, such as subroutine call and link instructions.

A subroutine call and link instruction (which may also be referred to herein as a call and link instruction; a call instruction; a branch and link instruction; or a procedure call and link instruction) is an instruction that jumps to a subroutine (a section of code to perform a specific task) at a call destination address, and, after the subroutine has been executed, returns to the calling point. In particular the last instruction of the subroutine is a subroutine return instruction which directs the processor to return to the calling point and start executing instructions. Accordingly, a subroutine can only be called by an instruction that stores a link back to the calling point.

The address at which the processor (e.g. processor 100) starts executing instructions after the subroutine return instruction is referred to herein as the target address for the subroutine return instruction, but it may also be referred to as the return address. The target address of the subroutine return instruction is generally the first instruction in the program after the call and link instruction to be executed after the subroutine. For some types of subroutine call and link instructions the target address for the corresponding subroutine return instruction is the address of the instruction in the program immediately following the subroutine call and link instruction. Such subroutine call and link instructions are referred to as compact subroutine call and link instructions. For other types of subroutine call and link instructions the target address of the corresponding subroutine return instruction may be the address of another instruction following the subroutine call and link instruction. In particular, some types of subroutine call and link instructions may always be followed in a program by a delay slot instruction. A delay slot instruction is an instruction that follows a branch instruction, but is executed before the branch instruction. For these types of call and link instructions the target address for the corresponding subroutine return instruction is the instruction immediately following the delay slot instruction.

Figure 2:
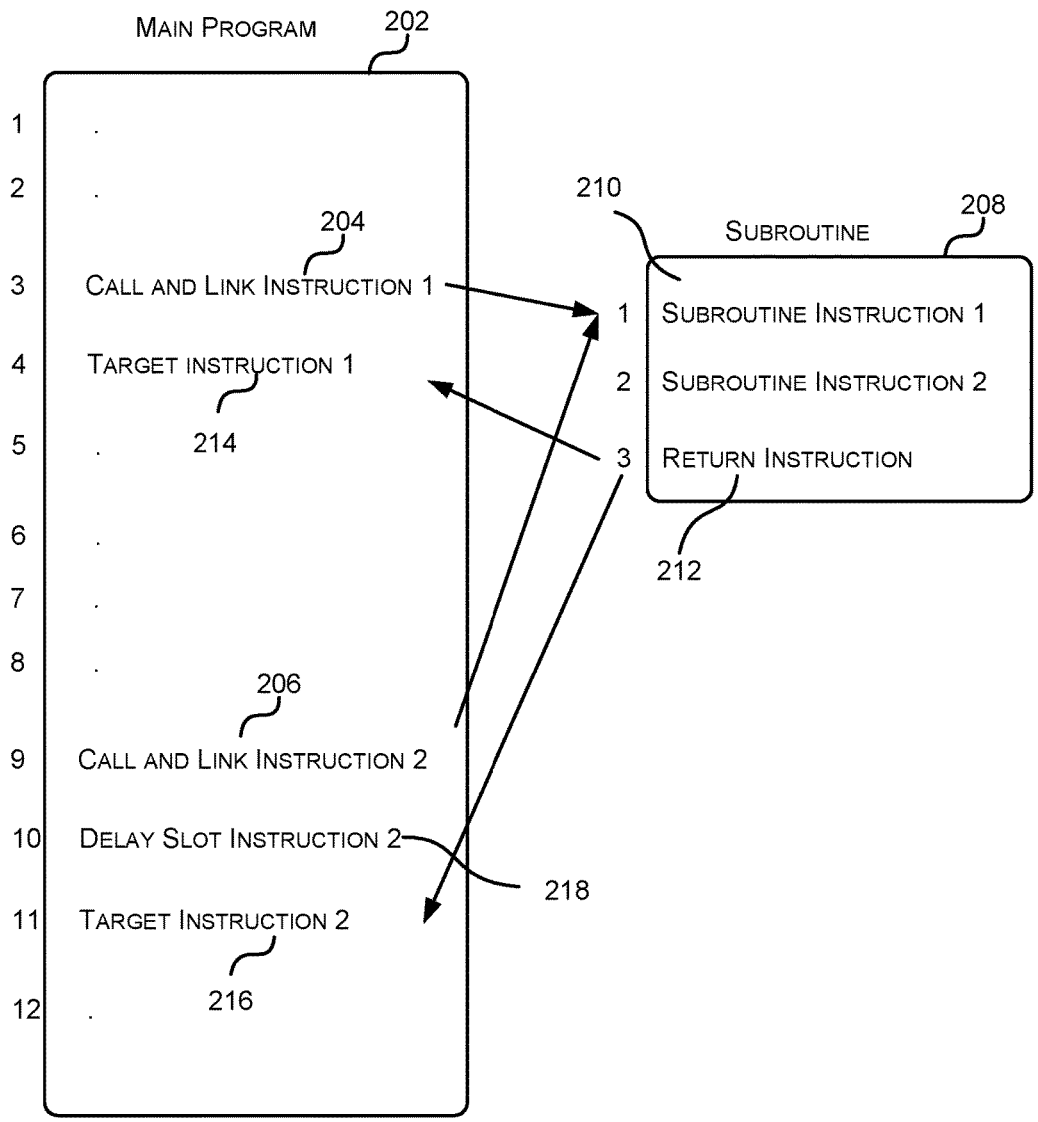
FIG. 2 is a schematic diagram illustrating an example program comprising subroutine call and link instructions.

Reference is now made to FIG. 2 which shows a schematic diagram of a main program 202 that comprises two subroutine call and link instructions 204 and 206 that call the same subroutine 208. Execution of either subroutine call and link instruction 204 or 206 causes (i) the target address for the corresponding subroutine return instruction to be stored in a return register; and (ii) a jump to the first instruction 210 of the subroutine 208. The last instruction of the subroutine (the subroutine return instruction 212) causes a jump back to the target instruction 214 or 216 at the target address specified by the return register (e.g. $31).

The first subroutine call and link instruction 204 is a compact call and link instruction and thus the target instruction 214 for the corresponding subroutine return instruction is the instruction immediately following the first subroutine call and link instruction 204 in the main program 102. The target address for the corresponding subroutine return instruction is thus the address of the target instruction 214 (e.g. address 4 of the main program 202). In contrast, the second subroutine call and link instruction 206 is a non-compact call and link instruction and thus it is followed by a delay slot instruction 218. Accordingly, the target instruction 216 for the corresponding subroutine return instruction is the instruction immediately following the delay slot instruction 218 in the main program 202. The target address for the corresponding subroutine return instruction is thus the address of the target instruction 216 (e.g. address 11 of the main program 202).

Subroutine call and link instructions include, but are not limited to the instructions shown in Table 1. It will be evident to a person of skill in the art that these are examples only and the methods and techniques described herein may be used for other subroutine call and link instructions.

TABLE 1

| Instruction | Name | Description | Compact | Delay Slot |
| --- | --- | --- | --- | --- |
| BLEZALC | branch on less than or equal to zero and link, compact | branches if the register is less than or equal to zero and saves the return address in the return address register (e.g. $ra or $31) | Y | N |
| BGEZALC | branch on greater than or equal to zero and link, compact | branches if the register is greater than or equal to zero and saves the return address in the return address register (e.g. $ra or $31) | Y | N |
| BGTZALC | branch on greater than zero and link, compact | branches if the register is greater than zero and saves the return address in the return address register (e.g. $ra or $31) | Y | N |
| BLTZALC | branch on less than zero and link, compact | branches if the register is less than zero and saves the return address in the return address register (e.g. $ra or $31) | Y | N |
| BNEZALC | branch on not equal to zero and link, compact | branches if the register is not equal to zero and saves the return address in the return address register (e.g. $ra or $31) | Y | N |
| JIALC | jump indexed and link, compact | jumps to the calculated address plus offset and saves the return address in the return address register (e.g. $ra or $31) | Y | N |
| JAL | jump and link | jumps to the calculated address and stores the target address in the return address register (e.g. $ra or $31) | N | Y |

Examples of subroutine return instructions are shown in Table 2. It will be evident to a person of skill in the art that these are examples only and the methods and techniques described herein may be used for other subroutine return instructions.

TABLE 2

| Instruction | Name | Description | Compact | Delay Slot |
|---|---|---|---|---|
| JIC | jump indexed, compact | jumps to instruction address in the specified register plus offset Note: Becomes a subroutine return instruction when the specified register is the return address register (e.g. $ra or $31) | Y | N |
| JR | jump register | jumps to instruction address in the specified register Note: Becomes a subroutine return instruction when the specified register is the return address register (e.g. $ra or $31) | N | Y |

As described above, the fetch unit 102 of a processor 100 fetches instructions from a program (in program order) as indicated by a program counter (PC). Instructions in a program are generally executed sequentially unless there control transfer instruction (CTI) (an instruction that changes the direction of the program), such as a branch instruction or a jump instruction. When instructions are executed sequentially the address of the next instruction is easily computed as the address of the current instruction plus a fixed offset (e.g. the length of an instruction). However, when a control transfer instruction is executed the address of the next instruction often takes some time to compute (e.g. one or more registers may have to be read etc.) which may cause a delay in fetching the next instruction for execution. To alleviate this problem branch predictors have been designed which are used to predict the address of the next instruction after a branch instruction.

As described above, when the branch predictor predicts the program flow accurately, this improves performance of the processor 100. However, if the branch predictor does not correctly predict the branch direction, then a misprediction occurs which needs to be corrected before the program can continue.

Since the target address for a subroutine return instruction can typically be determined from the address of the corresponding subroutine call and link instruction, the target address for a subroutine return instruction can be predicted by detecting subroutine call and link instructions and storing the target address for the corresponding subroutine call and link instruction in a return prediction stack (RPS). In particular, when a call and link instruction is detected the predicted target address for the corresponding subroutine return instruction is pushed onto the RPS and then the predicted target address is subsequently popped off the RPS when a subroutine return instruction is detected.

Figure 3:
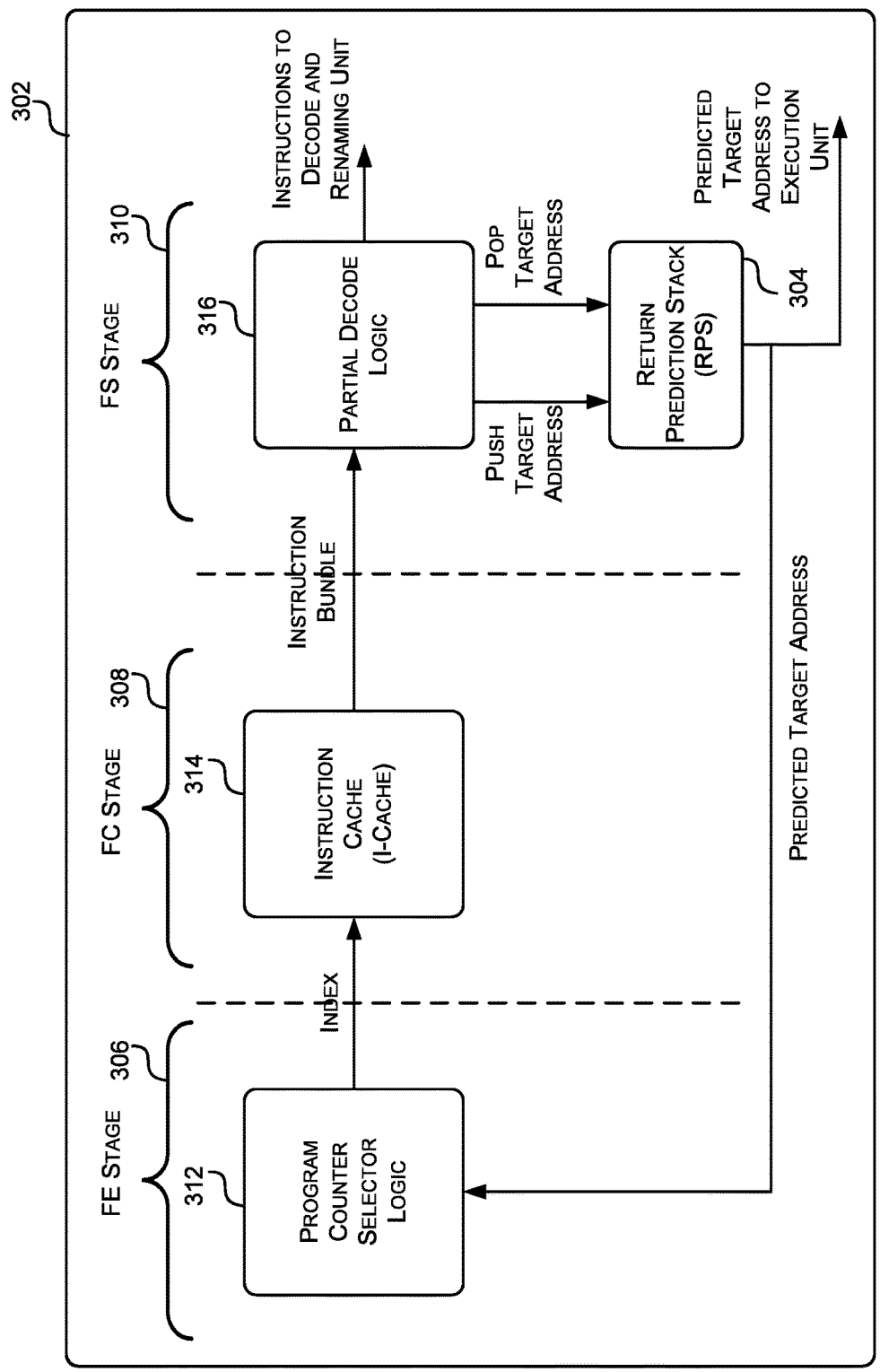
FIG. 3 is a block diagram of an example fetch unit of FIG. 1 for predicting the target address of subroutine return instructions.

Reference is now made to FIG. 3 which illustrates an example fetch unit 302, which may be used as fetch unit 102 of FIG. 1, which comprises a return prediction stack 304 for storing the predicted target addresses of subroutine return instructions.

The fetch unit 302 is implemented as a pipeline with three stages—a fetch (FE) stage 306, a cache (FC) stage 308 and a selection (FS) stage 310.

During the FE stage 306 program counter selector logic 312 sets the program counter (PC) to the address of the next instruction bundle to be fetched and generates and outputs an index based the PC to be used by the FC stage 308. In some cases the index is a subset of the bits of the PC. Which PC bits form part of the index may be based on the size of the instruction cache. Where the program is executing sequentially the program counter selector logic 312 increments the PC to the address of the next instruction bundle in the program (e.g. the program counter selector logic 312 may increment the PC by an offset that is equal to the size of an instruction bundle). Where, however, there has been a CTI the program counter selector logic 312 may receive another address from another module (e.g. the RPS 304) indicating that the instruction bundle at another address should be fetched. The program counter selection logic 312 may be thought of as a multiplexor that selects the address for the program counter based on one or more inputs received from one or more other modules or logic blocks (e.g. the RPS 304).

During the FC stage 308 the index generated by the FE stage 306 is used to fetch the next instruction bundle to be executed from an instruction cache 314. If a match is found in the instruction cache 314 for the index generated by the program counter selection logic 312 then the instruction bundle matching the index is output to the FS stage 310.

During the FS stage 310 the instruction bundle received from the FC stage 308 is decoded by partial decode logic 316 to identify subroutine call and link instructions and subroutine return instructions. If the partial decode logic 316 identifies a subroutine call and link instruction in the received instruction bundle then the target address of the corresponding subroutine return instruction is predicted from the address of the subroutine call and link instruction and the type of instruction and pushed onto the RPS 304. If the partial decode logic 316 identifies a subroutine return instruction the predicted target address most recently added to the RPS 304 is popped off and sent to the FE stage 306.

Figure 4:
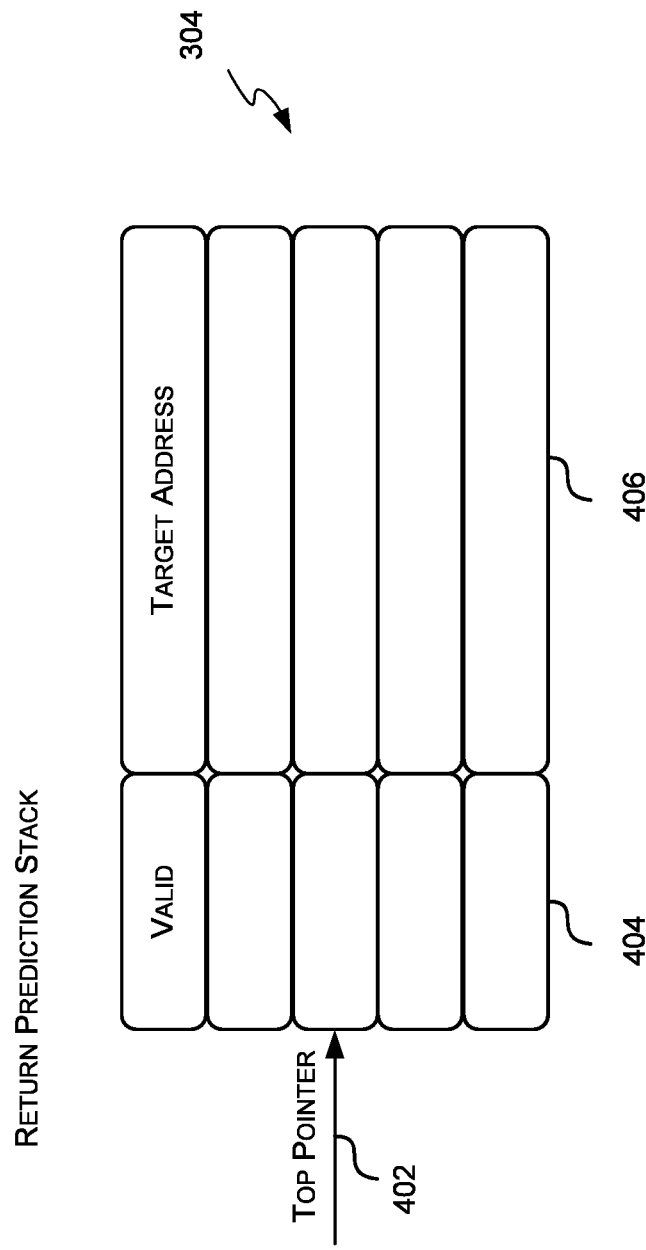
FIG. 4 is a schematic diagram of an example return prediction stack of FIG. 3.

Reference is now made to FIG. 4 which shows an example structure of the RPS 304 of FIG. 3.

A stack is typically used to provide a region of temporary storage and is implemented as last-in first-out (LIFO) storage resources (which may alternatively be referred to as a first-in last-out FILO) such that data is removed from the stack strictly in the reverse order to which it was added to the stack. The stack may be considered to grow up or down from a stack origin; however, in either case, the top of the stack, which is the most recently added element on the stack, may be identified by a top pointer.

For the purposes of the following description, a stack and in particular a return prediction stack (RPS) is considered to grow up such that the value of the stack pointer increases when data is pushed to the stack and decreases when data is popped from the stack. It will be appreciated, however, that the methods described herein are equally applicable if a stack and/or the RPS is considered to grow down (where the value of the stack pointer decreases when data is pushed to the stack and increases when data is popped from the stack).

In the example of FIG. 4 the RPS 304 is structured as a LIFO buffer with a top pointer 402 which points to the most recently created entry on the stack. Each entry comprises valid data 404 and target address data 406. The valid data 404 indicates whether the target address data is valid; and the target address data 406 is used to store the predicted target address for a subroutine return instruction.

When the partial decode logic 316 detects a subroutine call and link instruction the partial decode logic 316 predicts a target address for the corresponding subroutine return instruction from the address of the call and link instruction and the type of subroutine call and link instruction. For example, the partial decode logic 316 may predict the target address for a subroutine return instruction corresponding to a compact subroutine call and link instruction to be the address of the instruction immediately following the subroutine call and link instruction; and the partial decode logic 316 may predict the target address for a subroutine return instruction corresponding to a non-compact subroutine call and link instruction to be the address of the instruction immediately following the delay slot instruction (i.e. the address of the second instruction immediately following the subroutine call and link instruction).

Once the target address for the corresponding subroutine return instruction has been predicted it is pushed onto the RPS 304. This may involve adjusting (e.g. incrementing) the top pointer 402 to the next free entry or slot of the RPS 304, storing the predicted target address as the target address data 406 of the entry or slot pointed to by the top pointer and setting the valid data 404 to indicate the corresponding target address data 406 is valid.

When the partial decode logic 316 detects a subroutine return instruction if the entry of the RPS pointed to by the top pointer has a valid target address data 406 (e.g. the valid data 404 indicates the target address data 406 is valid) then the predicted target address is popped off the RPS 304. This may involve outputting the predicted target address, clearing the valid data 404 and adjusting (e.g. decrementing) the top pointer 402 to point to the next valid entry or slot of the RPS 304.

Figure 5:
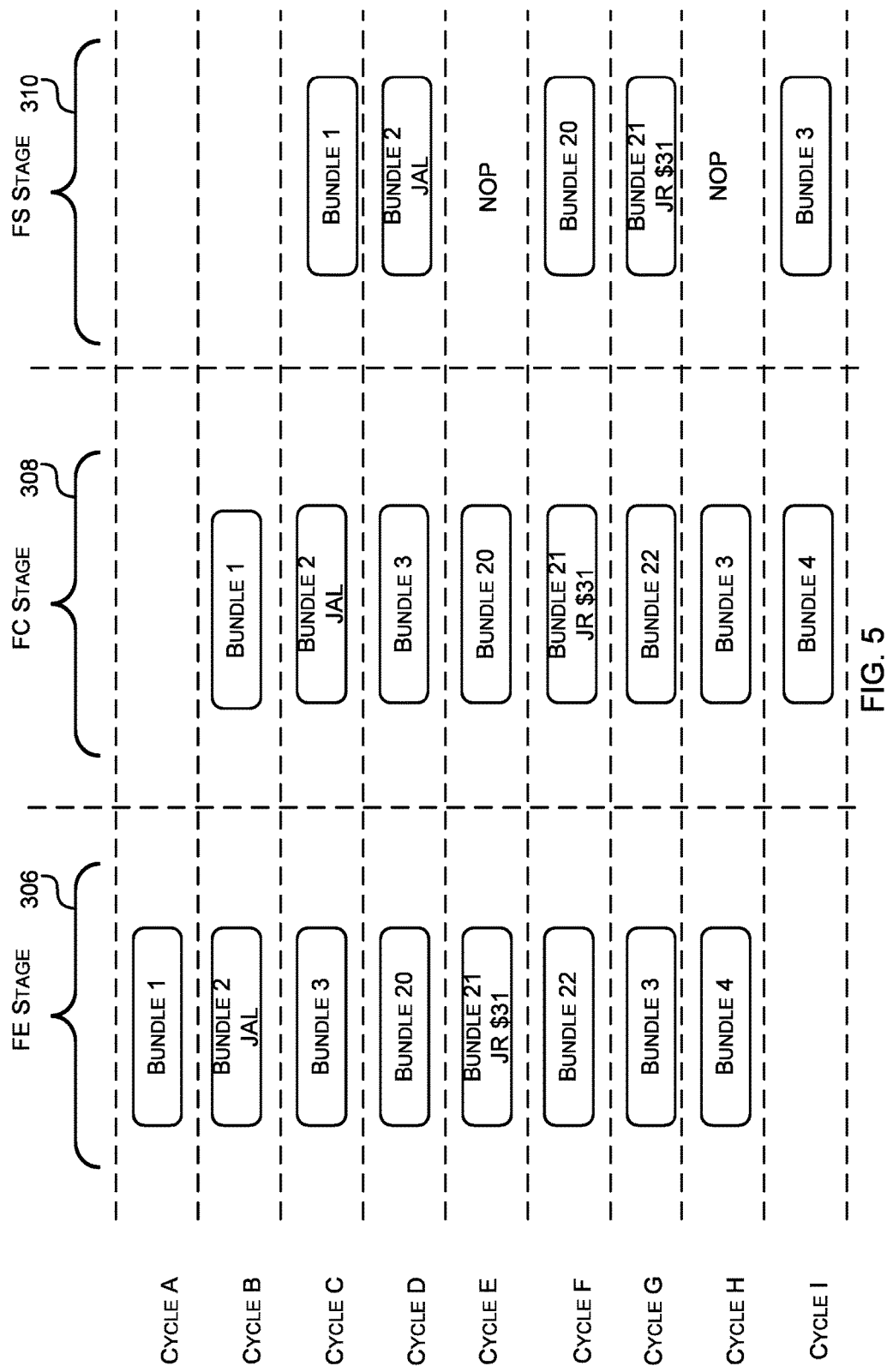
FIG. 5 is a timing diagram illustrating the status of the fetch unit of FIG. 3 over a number of cycles as a program is executed.

Reference is now made to FIG. 5 which shows an example of how instructions of an example program are fetched by the fetch unit 302 of FIG. 3. In particular, FIG. 5 shows which instruction bundle the output of each stage of the fetch unit 302 relates to in a particular cycle. For example, in cycle A the output of the FE stage 306 (e.g. the index/PC) relates to instruction bundle 1.

In the example shown in FIG. 5, in cycle A the FE stage 306 sets the PC to the address of instruction bundle 1. In cycle B the FE stage 306 sets the PC to the address of the next instruction bundle (e.g. instruction bundle 2) and the FC stage 308 fetches instruction bundle 1. In cycle C the FE stage 306 sets the PC to the address of the next instruction bundle (e.g. instruction bundle 3), the FC stage 308 fetches instruction bundle 2, and the FS stage 310 decodes instruction bundle 1. Accordingly in cycles A, B and C instructions are fetched and decoded in sequential order.

In cycle D, however, the FS stage 310 detects a subroutine call and link instruction (e.g. JAL) indicating a change in direction of the program. Specifically it indicates that the next instruction bundle to be executed is not the instruction bundle immediately following the current instruction bundle (e.g. instruction bundle 3). Accordingly, the FS stage 310 notifies the FE stage 306 of the target address of the subroutine call and link instruction which causes the FE stage 306 to set the PC to the target address of the call and link instruction (e.g. the address of instruction bundle 20). The FS stage 310 also predicts the target address for the corresponding subroutine return address (which in this case is the address of instruction bundle 3) and stores the predicted target address in the RPS 304.

In cycle D the FC stage 308 has fetched instruction bundle 3, but instruction bundle 3 is no longer the next instruction bundle to be executed so in the following cycle (e.g. cycle E) instruction bundle 3 is discarded by the FS stage 310 and the FS stage 310 does not produce any useful output. This is referred to as a CTI bubble.

The fetch unit then continues fetching instructions in program order (e.g. cycle F).

In cycle G the FS stage 310 detects a subroutine return instruction (e.g. JR $31) indicating a change in direction of the program. Specifically it indicates the next instruction bundle to be executed is not the instruction bundle immediately following the current instruction bundle (e.g. instruction bundle 22). The FS stage 310 then pops the most recently added valid target address from the RPS (e.g. the target address generated and stored in cycle D) and provides the FE stage 306 with the target address (in this case the address of instruction bundle 3). This causes the FE stage 306 to set the PC to the target address (i.e. the address of instruction bundle 3).

In cycle G the FC stage 308 has fetched instruction bundle 22, but instruction bundle 22 is no longer the next instruction bundle to be executed so in the following cycle (e.g. cycle H) instruction bundle 22 is discarded by the FS stage 310 and the FS stage 310 does not produce any useful output. This is referred to as a CTI bubble—a delay caused by a control transfer instruction.

It is only in cycle I that the FS stage 310 receives and processes instruction bundle 3.

It can be seen from FIG. 5 that the instruction bundle following the instruction bundle with the subroutine call and link instruction (e.g. instruction bundle 3) was fetched in the FC stage 308 in cycle D and again in cycle H after the subroutine instruction is identified. The inventor has identified that in some cases if the instruction bundle following an instruction bundle that includes a subroutine call and link instruction is stored then a cycle does not have to be wasted re-retrieving the instruction bundle that was already fetched. In particular instead of cycle H being a null cycle for the FS stage 310 the stored instruction bundle can be fed to the FS stage 310 after the subroutine return address has been detected eliminating the CTI bubble after a subroutine return instruction.

FIGS. 6-16 will be used to described an improved fetch unit in which in addition to storing the predicted target address for a subroutine return instruction, in some cases, the predicted target instruction bundle for the subroutine return instruction is also stored. A "target instruction bundle" for a subroutine return instruction is the instruction bundle that comprises the target instruction for the subroutine instruction. As described above the target instruction is the instruction pointed to by the target address. Accordingly a predicted target instruction bundle for a subroutine return instruction comprises the instruction that is at the predicted target address.

Figure 6:
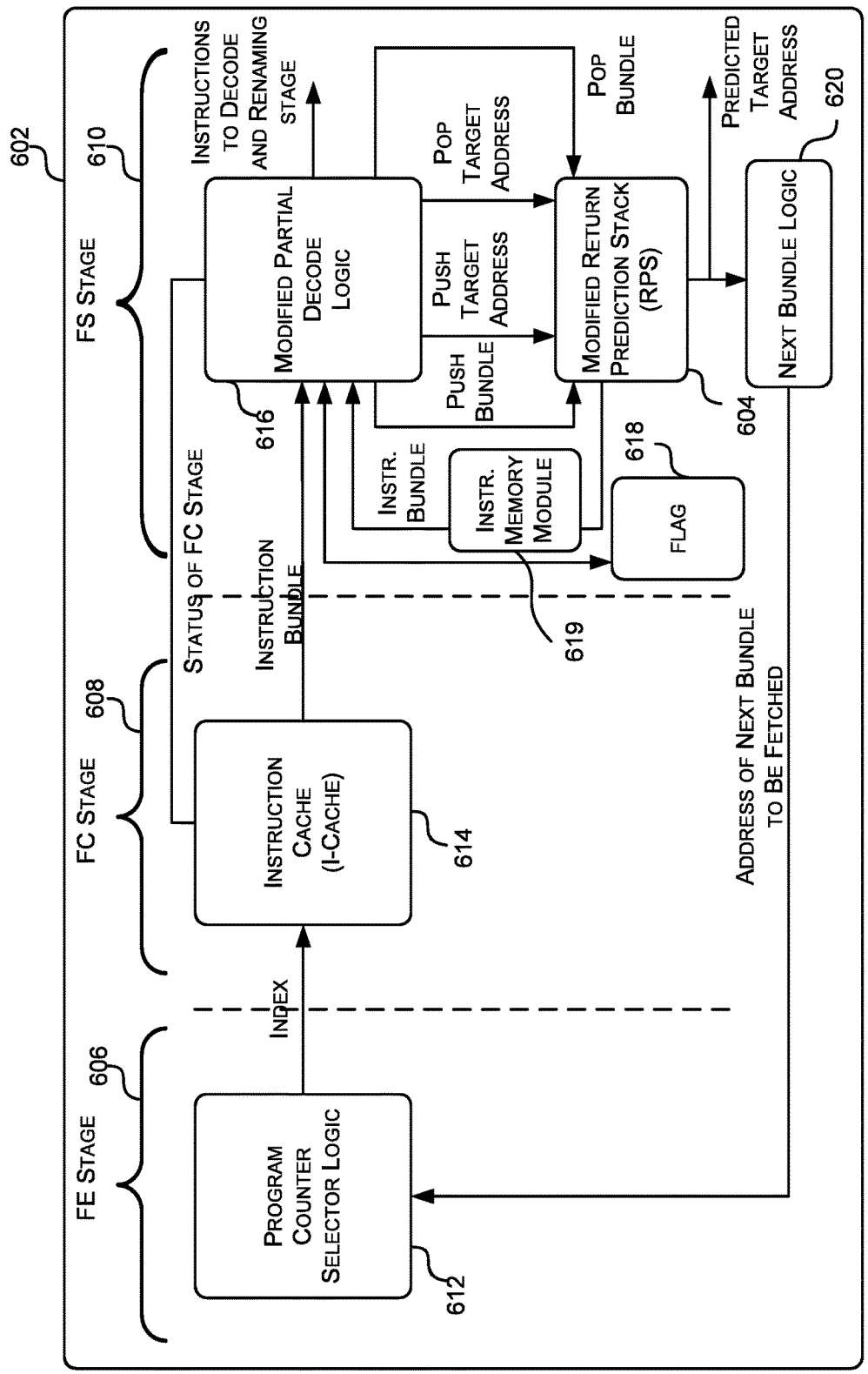
FIG. 6 is a block diagram of an example fetch unit for predicting the target address and target instruction bundle of subroutine return instructions.

Reference is now made to FIG. 6 which illustrates an example of a modified fetch unit 602, which may be used as fetch unit 102 of the processor 100 of FIG. 1. The modified fetch unit 602 has a modified RPS 604 for storing the predicted target instruction bundles for subroutine return instructions. Like the fetch unit 302 of FIG. 3, the modified fetch unit 602 implements a pipeline with three stages—a fetch (FE) stage 606, a cache (FC) stage 608 and a selection (FS) stage 610. The FE stage 606 and the FC stage 608 generally operate in the same manner as the FE stage 306 and the FC stage 308 of the fetch unit 302 of FIG. 3.

In particular, during the FE stage 606 program counter selector logic 612 sets the program counter (PC) to the address of the next instruction bundle to be fetched and generates and outputs an index based thereon to be used by the FC stage 606 to fetch the instruction bundle. When the program is executing sequentially the program counter selector logic 612 increments the PC to the address of the next instruction bundle in the program. Where, however, a CTI instruction has been detected (indicating a change in direction) then the FS stage 610 may provide an alternate address which is to be used as the next PC. For example, as described in more detail below, when the FS stage 610 detects a subroutine return instruction and there is a valid target address stored in the modified RPS 604 then the FS stage 610 may provide the program counter selector logic 612 with a new address to be used as the next PC based on the target address. As described above, the program counter selector logic 612 may be thought of as a multiplexor that selects the address for the program counter based on one or more inputs received from one or more other modules or logic blocks (e.g. the RPS 604).

During the FC stage 608 the index generated by the FE stage 606 is used to fetch an instruction bundle at the address indicated by the PC. In particular, during the FC stage 608 the index is used to search an instruction cache 614. If a match is found in the instruction cache 614 for the index then the instruction bundle associated with the index is output to the FS stage 610.

During the FS stage 610, modified partial decode logic 616 receives the instruction bundle output from the FC stage 608 and partially decodes the instructions contained therein to identify subroutine call and link instructions and subroutine return instructions. In some cases the modified partial decode logic 616 may be configured to identify subroutine call and link instructions and/or subroutine return instructions by analyzing the operational (OP) code of the instructions contained within the instruction bundle. However, it will be evident to a person of skill in the art that any mechanism for identifying certain types of instructions may be used by the modified partial decode logic 616 to identify subroutine call and link instructions and subroutine return instructions.

Like the partial decode logic 316 of the fetch unit 302 of FIG. 3, if the modified partial decode logic 616 of FIG. 6 identifies that one of the instructions in the received instruction bundle includes a subroutine call and link instruction then the modified partial decode logic 616 predicts the target address for the corresponding subroutine return instruction (i.e. the return address) and pushes the predicted target address onto the modified RPS 604. As described above, the target address for the corresponding subroutine return instruction may be predicted to be an address that is offset from the address of the subroutine call and link instruction.

For example, the modified partial decode logic 616 may be configured to predict the target address for a subroutine return instruction corresponding to a compact subroutine call and link instruction to be the address of the instruction immediately following the compact subroutine call and link instruction (e.g. the address of the subroutine call and link instruction plus an offset equal to the size of an instruction); and the modified partial decode logic 616 may be configured to predict the target address for a subroutine return instruction corresponding to a non-compact subroutine call and link instruction to be the address of the instruction immediately following the delay slot instruction (e.g. the address of the subroutine call and link instruction plus and offset equal to the size of two instructions).

However, unlike the partial decode logic 316 of FIG. 3, if the modified partial decode logic 616 identifies that one of the instructions in the instruction bundle is a subroutine call and link instruction then the modified partial decode logic 616 may also cause the following instruction bundle (i.e. the instruction bundle currently being fetched by the FC stage 608) to be stored alongside the predicted target address as the predicted target instruction bundle if certain conditions are met. In particular, in the cycle the FS stage 610 is decoding instruction bundle X the FC stage 608 will typically be fetching the instruction bundle immediately following instruction bundle X (e.g. instruction bundle X+1). If the predicted target address for the corresponding subroutine return instruction points to an instruction in instruction bundle X+1 (thus the target instruction bundle is instruction bundle X+1) then time and resources can be saved by storing instruction bundle X+1 instead of re-fetching it in response to detecting the corresponding subroutine return instruction.

Accordingly, if the modified partial decode logic 616 identifies that the instruction bundle includes a subroutine call and link instruction, the modified partial decode logic 512 determines whether (i) the predicted target instruction bundle for the corresponding subroutine is the instruction bundle immediately following the current instruction bundle (e.g. the predicted target address for the corresponding subroutine return instruction points to an instruction in the instruction bundle immediately following the current instruction bundle (the instruction bundle comprising the detected subroutine call and link instruction)); and (ii) whether the FC stage 608 is active.

In some cases the modified partial decode logic 616 may be configured to determine whether the target instruction bundle for the corresponding subroutine return instruction is the immediately following instruction bundle based on the predicted target address. In other cases the modified partial decode logic 616 may be configured to determine whether the target instruction bundle is the immediately following instruction bundle based on the format of the current instruction bundle.

As described above, for a compact subroutine call and link instruction the target address for the corresponding return address may be predicted to be the address of the instruction immediately following the subroutine call and link instruction. Accordingly, the predicted target address for the corresponding subroutine return instruction will point to an instruction in the next instruction bundle if the compact subroutine call and link instruction is the last instruction in the current instruction bundle (i.e. the instruction bundle currently being decoded) otherwise the target address will point to an instruction in the same instruction bundle.

In contrast, for a non-compact subroutine call and link instruction (i.e. a subroutine call and link instruction that is followed by a delay slot instruction) the target address for the corresponding return address may be predicted to be the address of the instruction immediately following the delay slot instruction. Accordingly, the predicted target address for the corresponding subroutine return instruction will point to an instruction in the following instruction bundle if the non-compact subroutine call and link instruction is the last instruction of the current instruction bundle; or if the delay slot instruction is the last instruction of the current instruction bundle (i.e. the instruction bundle currently being decoded).

When each instruction bundle comprises two instructions, the decision on whether to push the X+1$^{th}$ instruction bundle onto the modified RPS 604 when the X$^{th}$ instruction bundle comprises a subroutine call and link instruction is summarized in Table 3.

TABLE 3

| Instruction Bundle | Instruction Bundle X: Slot 0 | Instruction Bundle X: Slot 1 | Target Address for Subroutine Return Instruction | Target Instruction Bundle For Subroutine Return Instruction | Push Instruction Bundle X + 1 |
|---|---|---|---|---|---|
| X | Non-compact subroutine call and link instruction | Delay Slot Instruction | Instruction Bundle X + 1: Slot –0 | Instruction Bundle X + 1 | Yes |

TABLE 3-continued

| Instruction Bundle | Instruction Bundle X: Slot 0 | Instruction Bundle X: Slot 1 | Target Address for Subroutine Return Instruction | Target Instruction Bundle For Subroutine Return Instruction | Push Instruction Bundle X + 1 |
|---|---|---|---|---|---|
| X | Any Instruction | Non-compact subroutine call and link instruction | Instruction Bundle X + 1: Slot 1 | Instruction Bundle X + 1 | Yes |
| X | Any Instruction | Compact subroutine call and link instruction | Instruction Bundle X + 1: Slot 0 | Instruction Bundle X + 1 | Yes |
| X | Compact subroutine call and link instruction | Any Instruction | Instruction Bundle X: Slot 1 | Instruction Bundle X | No |

It can be seen from Table 3 that when each instruction bundle has two instructions and the subroutine call and link instruction is a non-compact instruction the target address for the corresponding subroutine call and return instruction will always point to an instruction in the following instruction bundle. Specifically, if the non-compact subroutine call and link instruction is the first instruction in a two-instruction bundle (e.g. instruction bundle X) then the target address for the corresponding subroutine return instruction is the first instruction in the immediately following instruction bundle (e.g. instruction bundle X+1). If, however, the non-compact subroutine call and link instruction is the second instruction in a two-instruction bundle (e.g. instruction bundle X) then the target address for the corresponding subroutine return instruction is the second instruction in the immediately following instruction bundle (e.g. instruction bundle X+1). In either case, then, the target instruction bundle is the immediately following instruction bundle (e.g. instruction bundle X+1). Accordingly, where the instruction bundle has a size of two then the modified partial decode logic 616 may be simplified by always causing the next instruction bundle to be saved in the RPS 604 when the modified partial decode logic detects a non-compact call and link instruction and the FC stage 608 is active.

Accordingly, the modified partial decode logic 616 may be configured to determine that the instruction bundle has a predetermined form if the identified subroutine call and link instruction is a compact subroutine call and link instruction that is the last instruction of the instruction bundle; or if the identified subroutine call and link instruction is a non-compact subroutine call and link instruction wherein the non-compact subroutine call and link instruction or the corresponding delay slot instruction is the last instruction of the instruction bundle.

If the modified partial decode logic 616 determines that the target instruction bundle for the corresponding subroutine return instruction is the instruction bundle immediately following the current instruction bundle; and the FC stage 608 is active (indicating that it is currently fetching the instruction bundle immediately following the current instruction bundle) then the modified partial decode logic 616 may cause the instruction bundle currently being fetched by the FC stage 608 to be saved in the modified RPS 604 as the target instruction bundle of the corresponding subroutine return instruction along with the saved target address.

Since the instruction bundle currently be fetched in the FC stage 608 is not output until the following cycle the modified partial decode logic 616 may be configured to set an indicator, such as a flag 618, indicating that in the subsequent cycle the instruction bundle received from the FC stage 608 should be saved in the modified RPS 604. Accordingly, in the next cycle the modified partial decode logic 616 will first determine whether the flag 618 is set and if so, save the instruction bundle received from the FC stage 608 in the modified RPS 604 alongside the target address most recently saved to the modified RPS 604.

In some cases, when the modified partial decode logic 616 determines that the target instruction bundle for the corresponding return instruction is not the instruction bundle immediately following the current instruction bundle the modified partial decode logic 616 is configured to determine whether the target instruction bundle for the corresponding subroutine instruction is the current instruction bundle. If it is determined that the target instruction bundle for the corresponding subroutine return instruction is the current instruction bundle then the current instruction bundle is pushed onto the modified RPS 604. Since the current instruction bundle can be immediately stored in the RPS the flag is not set.

An example method for determining when, and what data, to push to the modified RPS 604 will be described with reference to FIG. 9.

The modified partial decode logic 616 is also configured to identify subroutine return instructions in the received instruction bundle. If the modified partial decode logic 616 identifies a subroutine return instruction in the received instruction bundle and the top entry of the modified RPS 604 has a valid target address then the target address is popped from the modified RPS 604 and used to generate the address of the next instruction bundle to be fetched.

If certain conditions are met then any predicted target instruction bundle is also popped from the modified RPS 604 and stored in an instruction memory module 619. In the subsequent cycle the modified partial decode logic 616 will obtain and decode the instruction bundle stored in the instruction memory module 619.

The certain conditions may be that the modified RPS 604 has valid target instruction bundle data in the top entry of the modified RPS 604 and the instruction bundle comprising the subroutine return instruction is of a specified form. For example, as described in more detail below, in some cases the instruction bundle may be considered to be of the specified form if the subroutine return instruction is a compact subroutine return instruction and the subroutine return instruction is the last instruction in the instruction bundle; or if the subroutine return instruction is a non-compact subroutine return instruction (i.e. it is followed by a delay slot instruction) and the delay slot instruction is the last instruction in the instruction bundle.

When each instruction bundle comprises two instructions, the decision on whether to pop the target instruction bundle from the modified RPS 604 when the $X^{th}$ instruction bundle comprises a subroutine return instruction is summarized in Table 4.

TABLE 4

| Instruction Bundle | Instruction Bundle X: Slot 0 | Instruction Bundle X: Slot 1 | Next Instruction Bundle to Be Executed | Pop Target Instruction Bundle |
|---|---|---|---|---|
| X | Non-Compact Subroutine Return Instruction | Delay Slot Instruction | Target Instruction Bundle | Yes |
| X | Any Instruction | Non-Compact Subroutine Return Instruction | Instruction Bundle X + 1 | No |
| X | Any Instruction | Compact Subroutine Return Instruction | Target Instruction Bundle | Yes |
| X | Compact Subroutine Return Instruction | Any Instruction | Target Instruction Bundle | Yes |

As described in more detail below this eliminates the CTI bubble after a subroutine return instruction in certain cases which can significantly improve the performance of the modified fetch unit 602 and the processor in which it forms a part.

When data is popped from the modified RPS 604, the next instruction bundle to be fetched will depend on whether or not a target instruction bundle was popped from the modified RPS 604 for the subroutine return instruction. In particular, if an instruction bundle for the subroutine return instruction was popped from the modified RPS 604, then the popped instruction bundle is provided to the FS stage 610 in the next cycle and the next instruction bundle to be fetched is the instruction bundle immediately following the stored instruction bundle. Since the target address stored in the modified RPS 604 is the address of the instruction bundle stored in the modified RPS 604, the address of the next instruction bundle to be fetched can be calculated by adding an offset (e.g. equal to the size of an instruction bundle) to the stored target address. Conversely, if a target instruction bundle for the subroutine instruction was not popped off the modified RPS 604 then the address of the next instruction bundle to be fetched is the target address popped from the modified RPS 604.

Accordingly the FS stage 610 may comprise next bundle logic 620 that is configured to calculate and output the address of the next instruction bundle to be fetched based on whether or not a corresponding instruction bundle was popped off the modified RPS 604. An example method for determining the address of the next instruction bundle to be fetched, that may be executed by the next bundle logic 620, is described with reference to FIG. 15.

Figure 7:
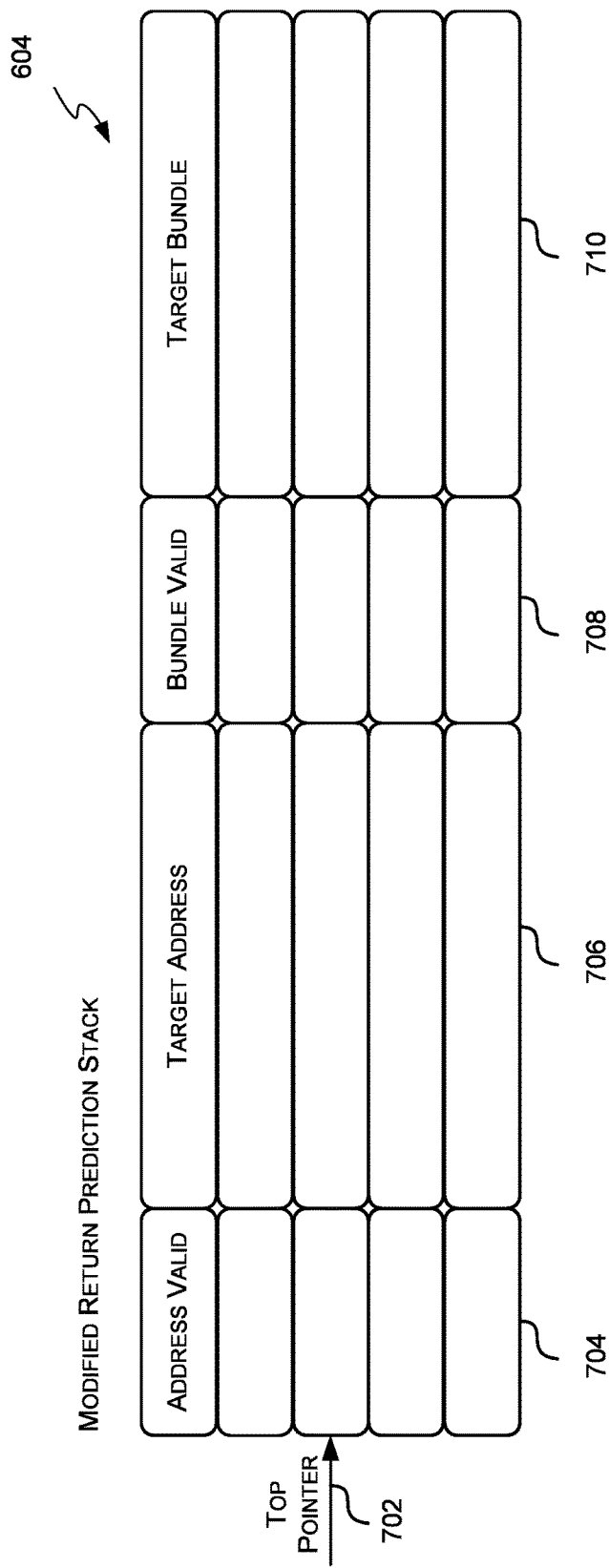
FIG. 7 is a block diagram of the modified return prediction stack of FIG. 6.

Reference is now made to FIG. 7 which shows an example structure of the modified RPS 604 of FIG. 6.

The example modified RPS 604 of FIG. 7 is structured as a LIFO buffer with a top pointer 702 which points to the most recently modified entry on the stack. Each entry may comprise address valid data 704, target address data 706, bundle valid data 708 and/or target bundle data 710. The address valid data 704 indicates whether the corresponding target address data 706 is valid; the target address data 706 is used to store the predicted target address for a subroutine return instruction; the bundle valid data 708 indicates whether the corresponding target bundle data 710 is valid; and the target bundle data 710 is used to store the predicted target instruction bundle for the subroutine return instruction.

As described above, when the modified partial decode logic 616 detects a subroutine call and link instruction the modified partial decode logic 616 predicts a target address for the corresponding subroutine return instruction from the address of the subroutine call and link instruction and the type of call and link instruction. For example, in some cases, where the call and link instruction is a compact call and link instruction the target address for the corresponding subroutine return may be predicted to be the address of the instruction immediately following the call and link instruction; and where the call and link instruction is a non-compact call and link instruction the target address for the corresponding subroutine return instruction may be predicted to be the address of the instruction immediately following the delay slot instruction (e.g. the address of the second instruction immediately following the delay slot instruction).

Once the target address for the corresponding subroutine return instruction has been predicted the modified partial decode logic 616 pushes the predicted target address onto the modified RPS 604. Pushing the predicted target address onto the modified RPS 604 may involve adjusting (e.g. incrementing) the top pointer 702 to point to the next free entry of the modified RPS 604; storing the predicted target address as the target address data 706 of the entry pointed to by the top pointer 702 and setting the corresponding address valid data 704 to indicate that the target address data is valid.

As described above, the modified partial decode logic 616 may also determine if certain conditions are met that indicate that the instruction bundle currently being fetched by the FC stage 606 should also be stored in the modified RPS 604 (e.g. that the target instruction bundle for the corresponding subroutine return instruction the instruction bundle immediately following the current instruction bundle; and that the FC stage 606 is active). If the modified partial decode logic 616 determines that the conditions are met then the modified partial decode logic 616 indicates, by for example setting a flag 618, that the instruction bundle currently being fetched by the FC stage 606 should be stored in the modified RPS 604.

In the immediately following cycle the modified partial decode logic 616 sees that the flag 68 is set and then stores the received instruction bundle in the modified RPS 604 in the most recently modified entry. This may involve storing the received instruction bundle as the target bundle data 710 of the entry pointed to by the top pointer 702 and setting the corresponding bundle valid data 708 to indicate that the target instruction bundle data is valid. It is noted that the top pointer 702 is not incremented at this time.

When the modified partial decode logic 616 detects a subroutine call and link instruction, if the entry of the modified RPS 604 pointed to by the top pointer 702 has a valid address data then the target address data is popped off the modified RPS 604 and used to determine the address of the next instruction bundle to be fetched.

As described above, the modified partial decode logic 616 may also determine if certain conditions are met that indicate any valid target instruction bundle is the next instruction bundle to be decoded. If the modified partial decode logic 616 determines that the conditions are met then if the entry of the modified RPS 604 pointed to by the top pointer 702 has valid instruction bundle data then the instruction bundle data is popped off the modified RPS 604 and is decoded by the FS stage 610 in the next cycle.

Once the target address and/or target instruction bundle have been output then the valid data indicators (e.g. address valid data 704 and bundle valid data 708) are cleared to indicate that the corresponding data is not valid and the top pointer 702 is decremented.

Figure 8:
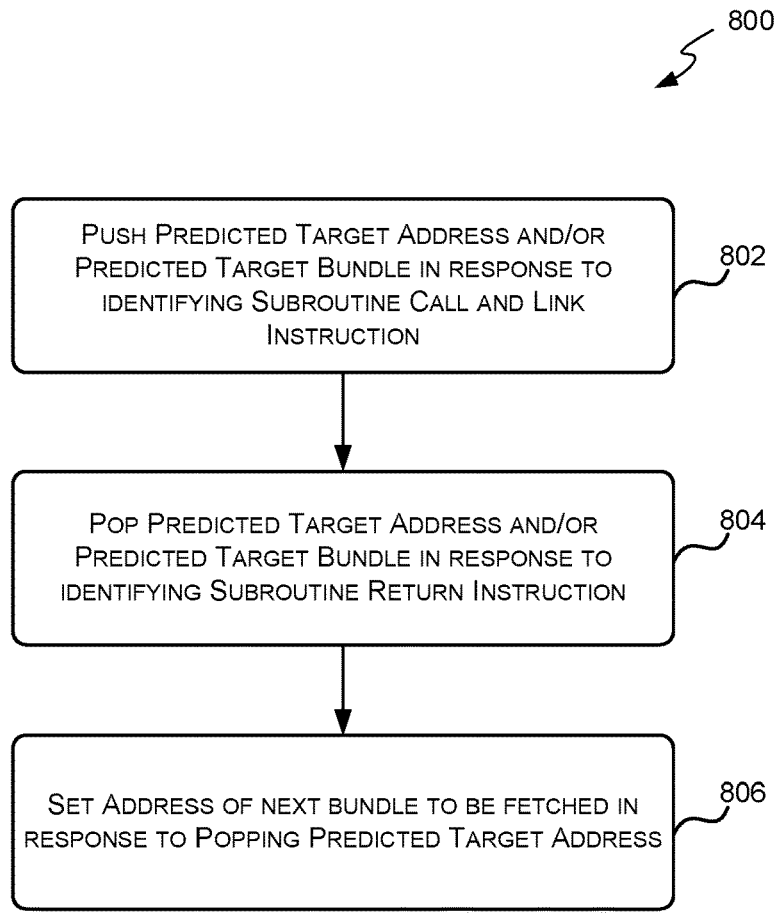
FIG. 8 is a flow diagram of an example method for predicting the target address and target instruction bundle for subroutine return instructions.

Reference is now made to FIG. 8 which illustrates an example method 800 for pushing data to and popping data from the modified RPS 604 which may be executed by the FS stage 610 each cycle. The method 800 begins at block 802 where the modified partial decode logic 616 pushes the predicted target address and/or predicted target instruction bundle onto the modified RPS 604 in response to identifying a subroutine call and link instruction in the received instruction bundle. For example, as described above, in response to identifying a subroutine call and link instruction in the received instruction bundle the modified partial decode logic 616 stores the predicted target address of the corresponding return instruction in the modified RPS 604; and if certain conditions are met the predicted target instruction bundle is also stored in the modified RPS 604. An example method for implementing block 802 is described with reference to FIG. 9.

At block 804, the modified partial decode logic 616 pops the predicted target address and/or predicted target instruction bundle from the modified RPS 604 in response to detecting a subroutine return instruction. For example, as described above, in response to identifying a subroutine return instruction in the received instruction bundle the modified partial decode logic 616 pops the first valid predicted target address from the modified RPS 604; and if certain conditions are met then any valid stored target instruction bundle is output and used as the input to the FS stage 610 in the next cycle. An example method for implementing block 804 is described with reference to FIG. 12.

At block 806, if data is popped off and/or output from the modified RPS 604 in block 804 then the next bundle logic 620 generates the address of the next instruction based on the predicted target address. For example, as described above, if only the target address is output or popped off the modified RPS 604 then the next bundle logic 620 may be configured to set the address of the next instruction bundle to be fetched to be the predicted target address. If, however, the predicted target address and the predicted target instruction bundle is output or popped off the modified RPS 604 then the next bundle logic 620 may be configured to set the address of the next instruction bundle to be fetched to be the instruction bundle immediately following the predicted target instruction bundle (i.e. the predicted target address+1 instruction bundle). An example method for implementing block 806 is described with reference to FIG. 15.

Figure 9:
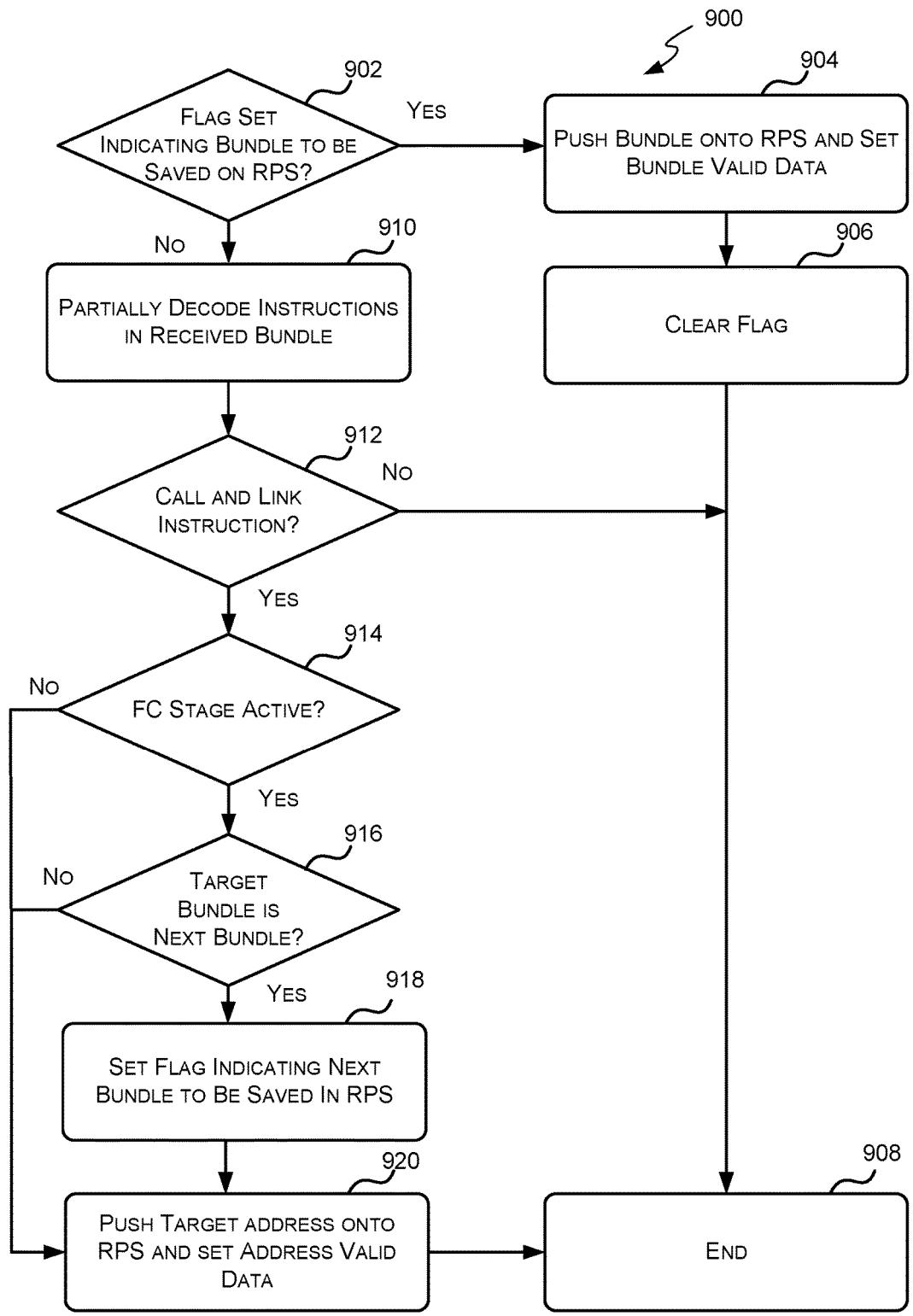
FIG. 9 is a flow diagram of an example method for pushing data onto the modified return prediction stack of FIG. 6.

Reference is now made to FIG. 9 which illustrates and example method 900 for pushing data to the modified RPS 604 which may be executed by the modified partial decode logic 616 each cycle. The method 900 begins at block 902 where the modified partial decode logic 616 determines whether the flag 618 is set. As described above (and below in relation to blocks 912 to 918) if in a particular cycle the modified partial decode logic 616 identifies a subroutine call and link instruction, and certain conditions are met for storing the instruction bundle currently being fetched, then the flag 618 is set to notify the modified partial decode logic 616 that in the next cycle the received instruction bundle is to be pushed onto the modified RPS 604.

Accordingly, if the modified partial decode logic 616 determines that the flag 618 is set then the modified partial decode logic 616 knows that in the previous cycle that a subroutine call and link instruction was detected and the conditions for storing the received instruction bundle have been met, thus the method 900 proceeds to blocks 904 and 906 where the received instruction bundle is pushed onto the modified RPS 604 and the flag 618 is cleared. The method then ends 908. If, however, the modified partial decode logic 616 determines that the flag 618 is not set then the method 900 proceeds to block 910.

At block 910, the modified partial decode logic 616 partially decodes the instructions in the received instruction bundle to determine if any of the instructions in the received instruction bundle is a subroutine call and link instruction. As described above, decoding the instruction may comprise identifying the type of instruction using the OP code. However, it will be evident to a person of skill in the art that other methods and techniques may be used for partially decoding instructions to identify subroutine call and link instructions. Once the instructions in the received instruction bundle have been partially decoded the method 900 proceeds to block 912.

At block 912, the modified partial decode logic 616 determines whether any of the instructions in the received instruction bundle is a subroutine call and link instruction. If none of the instructions in the received instruction bundle is a subroutine call and link instruction then the method 900 ends 908. If, however, one of the instructions in the received instruction bundle is a subroutine call and link instruction then the method 900 proceeds to blocks 914 and 916 where it is determined whether the conditions for storing the instruction bundle currently being fetched by the FC stage 608 are met.

At block 914, the modified partial decode logic 616 determines whether the FC stage 608 is active indicating that the FC stage 608 is currently fetching an instruction bundle. The modified partial decode logic 616 may determine whether the FC stage 608 is active by, for example, querying the FC stage 608 for its status or by receiving an indication from the FC stage 608 indicating its status. If the modified partial decode logic 616 determines that the FC stage 608 is not active and thus is not currently fetching an instruction bundle the method proceeds to block 920. If, however, the modified partial decode logic 616 determines that the FC stage 608 is active and is thus currently fetching an instruction bundle the method 900 proceeds to block 916.

At block 916, the modified partial decode logic 616 determines whether the predicted target instruction bundle for the corresponding subroutine return instruction is the instruction bundle immediately following the current instruction bundle. In some cases the modified partial decode logic 616 may be configured to predict the target address for the corresponding subroutine return instruction and determine whether the predicted target instruction bundle for the corresponding subroutine return instruction is the instruction bundle immediately following the current instruction bundle based on the predicted target address. For example, the modified partial decode logic 616 may determine whether the predicted target instruction bundle for the corresponding subroutine return instruction is the instruction bundle immediately following the current instruction bundle based on whether the predicted target address points to an instruction in the instruction bundle immediately following the current instruction bundle.

In other cases, the modified partial decode logic 616 may determine whether the predicted target instruction bundle for the corresponding subroutine return instruction is the instruction bundle immediately following the current instruction bundle based on whether the current instruction bundle has a specific form. As described above, the modified partial decode logic 616 may be configured to determine that the current instruction bundle has a specific form if either (a) the identified subroutine call and link instruction is a compact call and link instruction that lies in the last slot of the instruction bundle; or (b) the identified call and link instruction is a non-compact call and link instruction (i.e. it is followed by a delay slot instruction) and the non-compact call and link instruction or the corresponding delay slot instruction is in the last slot of the instruction bundle. If it is determined that the instruction bundle has a specific form then the conditions for storing the subsequent instruction bundle are met and the method 900 proceeds to block 918. If, however, the bundle does not have a specific form then the conditions for storing the subsequent instruction bundle in the modified RPS 604 are not met and the method 900 proceeds to block 920.

In some cases, if the modified partial decode logic 616 determines that the predicted target instruction bundle for the corresponding return instruction is not the instruction bundle immediately following the current instruction bundle, prior to proceeding to block 920 the modified partial decode logic 616 may be configured to determine whether the predicted target instruction bundle for the corresponding subroutine instruction is the current instruction bundle. If it is determined that the predicted target instruction bundle for the corresponding subroutine return instruction is the current instruction bundle then the modified partial decode logic 616 may push the current instruction bundle onto the modified RPS 604 and the target bundle valid data may be set. The method 900 then proceeds to block 920.

At block 918, the modified partial decode logic 616 sets the flag 618 or other indicator to cause the modified partial decode logic 616 to push the instruction bundle received in the next cycle onto the modified RPS 604. Once the flag 618 or other indicator has been set the method 900 proceeds to block 920.

At bock 920, the modified partial decode logic 616 predicts the target address of the corresponding subroutine return instruction and then pushes the target address onto the modified RPS 604. As described above, the target address of the corresponding subroutine return instruction may be based on the address of the subroutine call and link instruction that was identified in block 912 and the type of instruction. For example, in some cases, for compact subroutine call and link instructions the target address of the corresponding subroutine return instruction may be predicted to be the address of the instruction immediately following the subroutine call and link instruction. However, for non-compact subroutine call and link instructions the target address of the corresponding subroutine return instruction may be predicted to be the address immediately following the delay slot instruction.

Once the target address for the corresponding subroutine return instruction has been predicted it is pushed onto the modified RPS 604 which may involve adjusting (e.g. incrementing) the top pointer to point to the next free entry or slot of the modified RPS 604, storing the predicted target address as the target address data 706, and setting the valid address data to indicate that the target address data is valid. Once the target address has been pushed onto the modified RPS 604 the method 900 ends 908.

Figure 10:
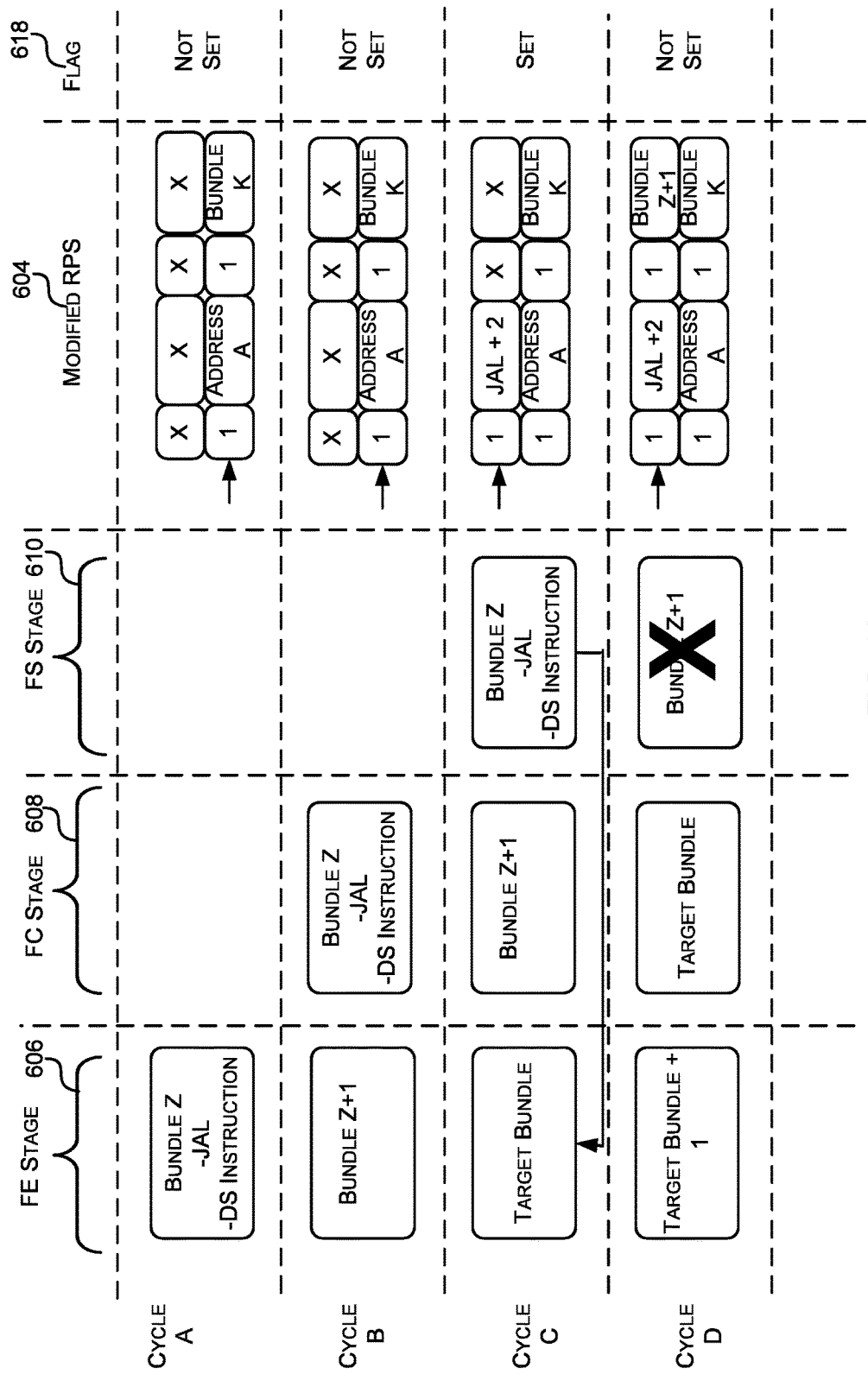
FIG. 10 is a timing diagram of the status of the modified fetch unit of FIG. 6 over a number of cycles when the method of FIG. 9 is used.
Figure 11:
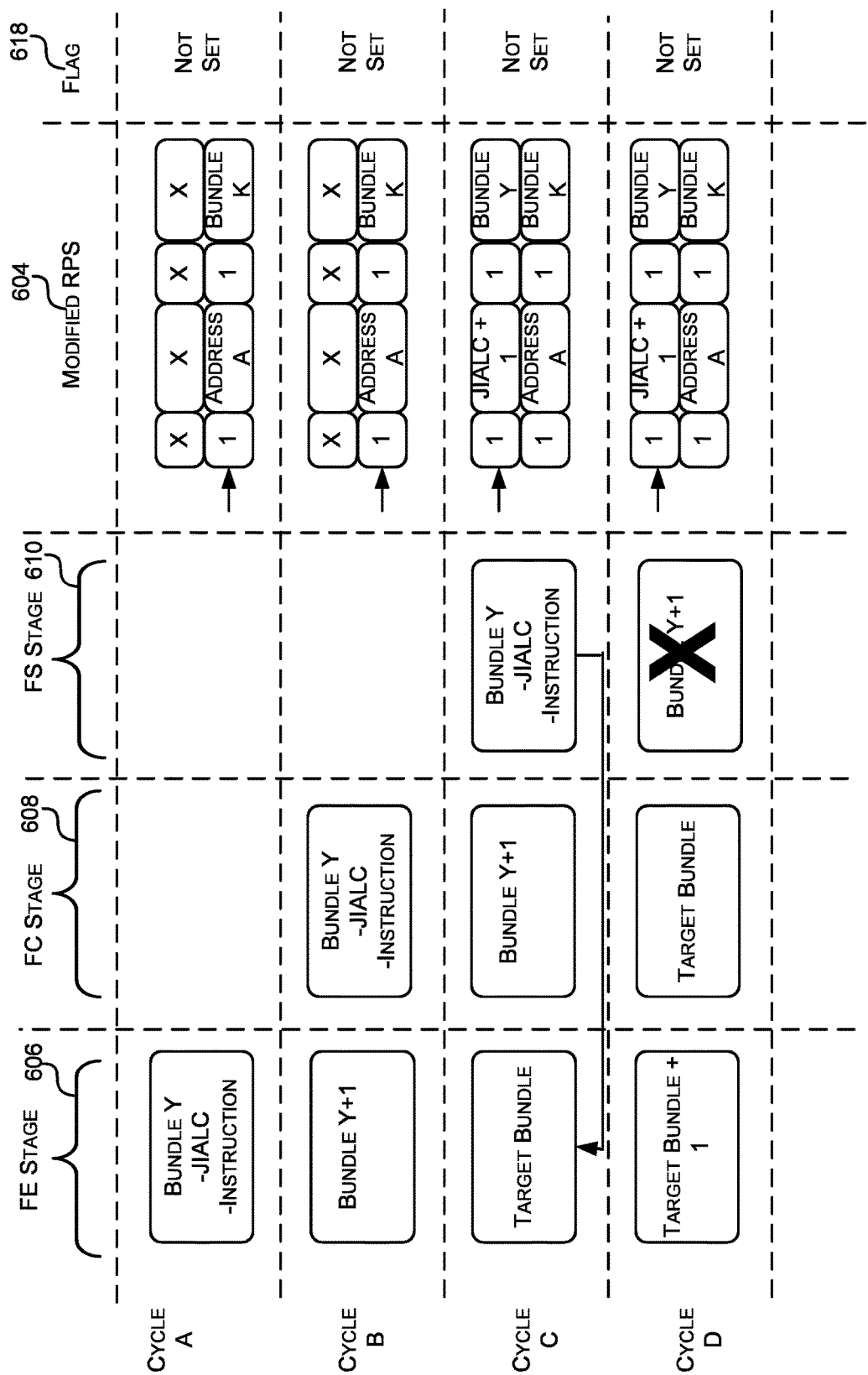
FIG. 11 is a timing diagram of the status of the modified fetch unit of FIG. 6 over a number of cycles when the method of FIG. 9 is used.

Reference is now made to FIGS. 10 and 11 which illustrate example timing diagrams which show the status of the modified fetch unit 602 of FIG. 6 over several cycles when the method 900 of FIG. 9 is used to push data to the modified RPS 604. In particular, FIG. 10 shows the status of the modified fetch unit 602 as a call an link instruction that meets the conditions for storing the next instruction bundle in the modified RPS 604 moves through the fetch pipeline; and FIG. 11 shows the status of the modified fetch unit as a subroutine call and link instruction that does not meet the conditions for storing the next instruction bundle in the modified RPS 604 moves through the fetch pipeline. In the examples of FIGS. 10 and 11 each instruction bundle comprises two instructions.

Referring first to the example of FIG. 10, in the first cycle (cycle A) the FE stage 606 sets the program counter (PC) to the address of Bundle Z which is a bundle that comprises a JAL instruction (which is a non-compact subroutine call and link instruction) followed by a delay slot instruction. In the second cycle (cycle B) the FE stage 606 increments the PC to point to the next instruction bundle, bundle Z+1, and the FC stage 608 fetches bundle Z.

In the third cycle (cycle C) the FC stage fetches bundle Z+1 and the FS stage 610 decodes bundle Z. Since instruction bundle Z comprises a subroutine call and link instruction (the JAL instruction) the FS stage 610 predicts the target address for the corresponding subroutine return address as the address of the instruction immediately following the delay slot instruction and pushes the predicted target address in the modified RPS 604. In particular, the FS stage 610 increments the top pointer, saves the predicted target address as the target address data and sets the valid address data (e.g. sets the valid address bit to one) to indicate the corresponding target address data is valid.

Also since bundle Z is of a predetermined form (a non-compact subroutine call and link instruction followed by a delay slot instruction) and the FC stage 608 is active, the conditions for storing the bundle (bundle Z+1) currently being fetched in the FC stage 608 are met, and so the FS stage 610 sets the flag 618.

Further, since bundle Z includes a CTI (e.g. the JAL instruction) the next bundle to be fetched is not bundle Z+1 but is the bundle at the target address for the JAL instruction. If the target address is available it is provided to the FE stage 606 so the PC can be set to the target address.

In the fourth cycle (cycle D) the FE stage 606 the sets the PC to the next instruction bundle (target instruction bundle+1) and the FC stage 608 fetches the target instruction bundle for the subroutine call and link instruction (e.g. the JAL instruction). The FS stage 610 receives instruction bundle Z+1 from the FC stage 608, but since the flag 618 is set, instruction bundle Z+1 is not decoded or output, it is simply pushed onto the modified RPS 604. The FS stage 610 then clears the flag 618.

Accordingly, it can be seen that in this example both the predicted target address and predicted target instruction bundle for the corresponding subroutine return instruction are stored in the modified RPS 604 for later use.

Reference is now made to the second example of FIG. 11, in the first cycle (cycle A) the FE stage 606 sets the program counter (PC) to the address of instruction bundle Y which is a bundle that comprises a JIALC instruction (which is a compact subroutine call and link instruction) followed by an instruction. In the second cycle (cycle B) the FE stage 606 increments the PC to point to the next instruction bundle, instruction bundle Y+1 and the FC stage 608 fetches instruction bundle Y.

In the third cycle (cycle C) the FC stage 608 fetches instruction bundle Y+1 and the FS stage 610 decodes instruction bundle Y. Since instruction bundle Y comprises a compact subroutine call and link instruction (the JIALC instruction) the FS stage 610 predicts the target address for the corresponding subroutine return address to be the address of the instruction immediately following the call and link instruction and pushes the predicted target address onto the modified RPS 604. In particular, the FS stage 610 increments the top pointer, saves the predicted target address as the target address data 706 and sets the valid address data 708 to indicate the target address data 706 is valid (e.g. sets the valid address bit to one).

However, in contrast to the example of FIG. 10, bundle Y does not meet the conditions for storing the next instruction bundle in the modified RPS 604 since the predicted target address is the second instruction in instruction bundle Y therefore the flag 618 is not set. However, since the predicted target address points to an address in the current instruction bundle, instruction bundle Y, (thus the current instruction bundle, instruction bundle Y, is the predicted target instruction bundle) the current instruction bundle is pushed onto the modified RPS 604.

Further, since instruction bundle Y includes a CTI (e.g. the JAL instruction) the next bundle to be fetched is not bundle Y+2 but is the bundle at the target address for the JAL instruction. If the target address is available it is provided to the FE stage 606 so the PC can be set to the target address.

In the fourth cycle (cycle D) the FE stage 606 sets the PC to the next instruction bundle (target instruction bundle+1) and the FC stage 608 fetches the target instruction bundle for the subroutine call and link instruction (e.g. the JIALC instruction). The FS stage 610 receives bundle Y+1 from the FC stage 608, but since the flag is not set, the FS stage 610 simply discard its.

Accordingly, it can be seen that in this example, like the example of FIG. 10, both the predicted target address and the predicted instruction bundle for the corresponding subroutine return instruction is stored in the modified RPS 604 for later use. However, in this example the predicted instruction bundle was the current instruction bundle thus it was immediately stored in the modified RPS 604 instead of having to wait a cycle to push the predicted target instruction bundle to the modified RPS 604.

Figure 12:
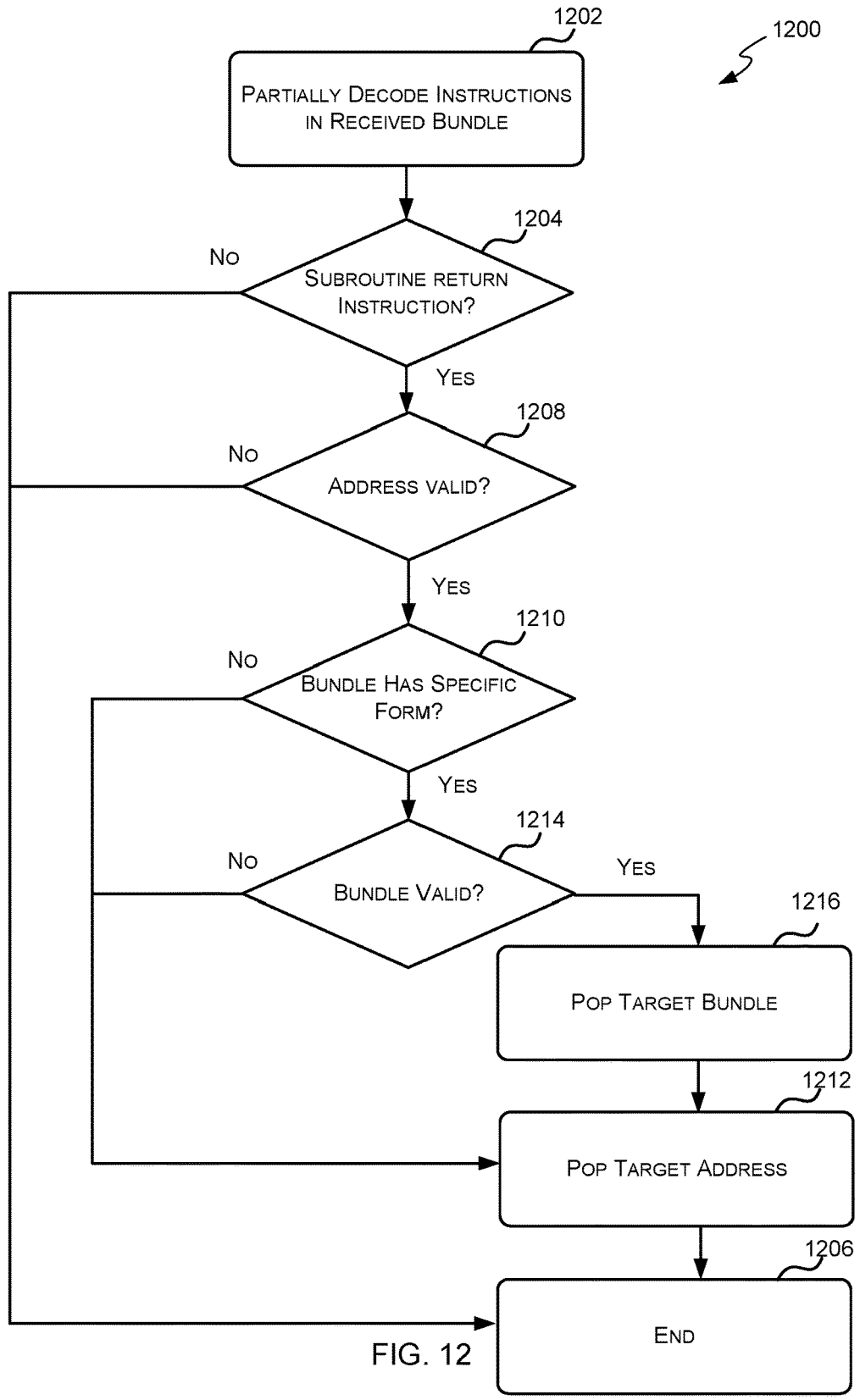
FIG. 12 is a flow diagram of an example method for popping data off the modified return prediction stack of FIG. 6.

Reference is now made to FIG. 12 which illustrates an example method 1200 for popping data from the modified RPS 604 which may be executed by the modified partial decode logic 616 each cycle. The method 1200 begins at block 1202 where the modified partial decode logic 616 partially decodes the received instruction bundle to determine if it includes a subroutine return instruction. In some cases the modified partial decode logic 616 may be configured to analyze the OP codes of the instructions in the received instruction bundle to determine if any of the instructions in the instruction bundle is a subroutine return instruction. Once the instruction bundle has been partially decoded the method 1200 proceeds to block 1204.

At block 1204, the modified partial decode logic 616 determines whether any of the instructions in the instruction bundle is a subroutine return instruction. If it is determined that none of the instructions in the instruction bundle is a subroutine return instruction the method 1200 ends 1206. If, however, it is determined that one of the instructions in the instruction bundle is a subroutine return instruction, the method 1200 proceeds to block 1208.

At block 1208, the modified partial decode logic 616 determines whether the target address data 706 stored in the top entry of the modified RPS 604 is valid. In some cases the modified partial decode logic 616 may be configured to analyze the address valid data 704 to determine whether the corresponding target address data 706 is valid. Where the address valid data 704 is implemented as a single bit the modified partial decode logic 616 may determine that the target address stored in the top entry of the modified RPS 604 is valid if the address valid bit is set. If the modified partial decode logic 616 determines that the target address stored in the top entry of the modified RPS 604 is not valid then the method 1200 ends 1206. If, however, the modified partial decode logic 616 determines that the target address data 706 is valid then the method proceeds to block 1210.

At block 1210, the modified partial decode logic 616 determines whether the instruction bundle has a specific form that indicates that the next instruction bundle to be executed is the predicted target instruction bundle. For example, as described above, the modified partial decode logic 616 may determine that the received instruction bundle has the specific form if the identified subroutine return instruction is a compact subroutine return instruction; or, if the identified subroutine return instruction is a non-compact subroutine return instruction (i.e. it is followed by a delay slot instruction) and the corresponding delay slot instruction is in the same instruction bundle as the subroutine return instruction.

If the modified partial decode logic 616 determines that the received instruction bundle does not have the specific form then even if the predicted target instruction bundle was saved in the modified RPS 604 it is not used so the method 1200 proceeds to block 1212 where the target predicted address is popped off the modified RPS 604. If, however, the modified partial decode logic 616 determines that the received instruction bundle has the specific form then if a valid predicted target instruction bundle has been stored in the modified RPS 604 then the predicted target instruction bundle can be fed to the FS stage 610 in the next cycle so the method 1200 proceeds to block 1214.

At block 1214, the modified partial decode logic 616 determines whether the top entry of the modified RPS 604 comprises valid target bundle data 710. In some cases the modified partial decode logic 616 may be configured to analyze the bundle valid data 708 to determine whether the top entry of the modified RPS 604 comprises valid target bundle data 710. Where the bundle valid data 708 is implemented as a single bit the modified partial decode logic 616 may determine that the target bundle data stored in the top entry of the modified RPS 604 is valid if the bundle valid bit is set. If the modified partial decode logic 616 determines that the target instruction bundle stored in the top entry of the modified RPS 604 is not valid then the method 1200 proceeds to block 1212 where the target address is popped from the modified RPS 604. If, however, the modified partial decode logic 616 determines that the target bundle data 710 is valid then the method 1200 proceeds to block 1216.

At block 1216, the modified partial decode logic 616 pops the top target bundle data 710 off the modified RPS 604. This may involve outputting the top target bundle data 710 (the target bundle data 710 in the entry pointed to by the top pointer 702) and saving it in an instruction memory module 619. Once the target bundle data 710 has been popped off the modified RPS 604, the method 1200 proceeds to block 1212.

At block 1212, the modified partial decode logic 616 pops the target address data 706 off the modified RPS 604. This may involve outputting the top target address data 706 to the next bundle logic 620 where the address of the next bundle to be fetched is determined from the output target address data 706. The modified partial decode logic 616 may also clear both valid data fields (i.e. the address valid data 704 and the bundle valid data 708) and adjust (e.g. decrement)

the top pointer 702. Once the target address data 706 has been popped off the modified RPS 604 the method 1200 ends 1206.

Figure 13:
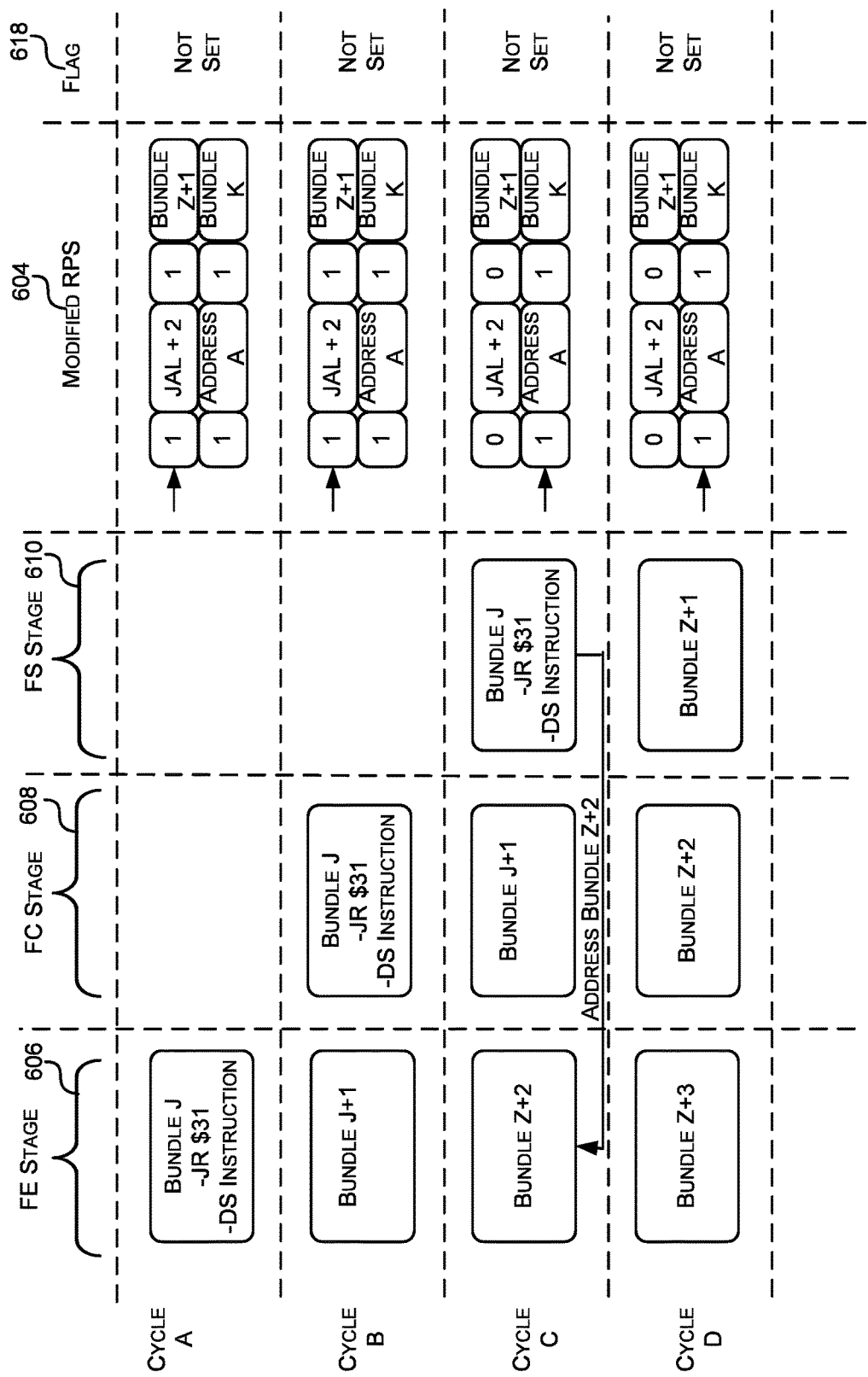
FIG. 13 is a timing diagram of the status of the modified fetch unit of FIG. 6 over a number of cycles when the method of FIG. 12 is used.
Figure 14:
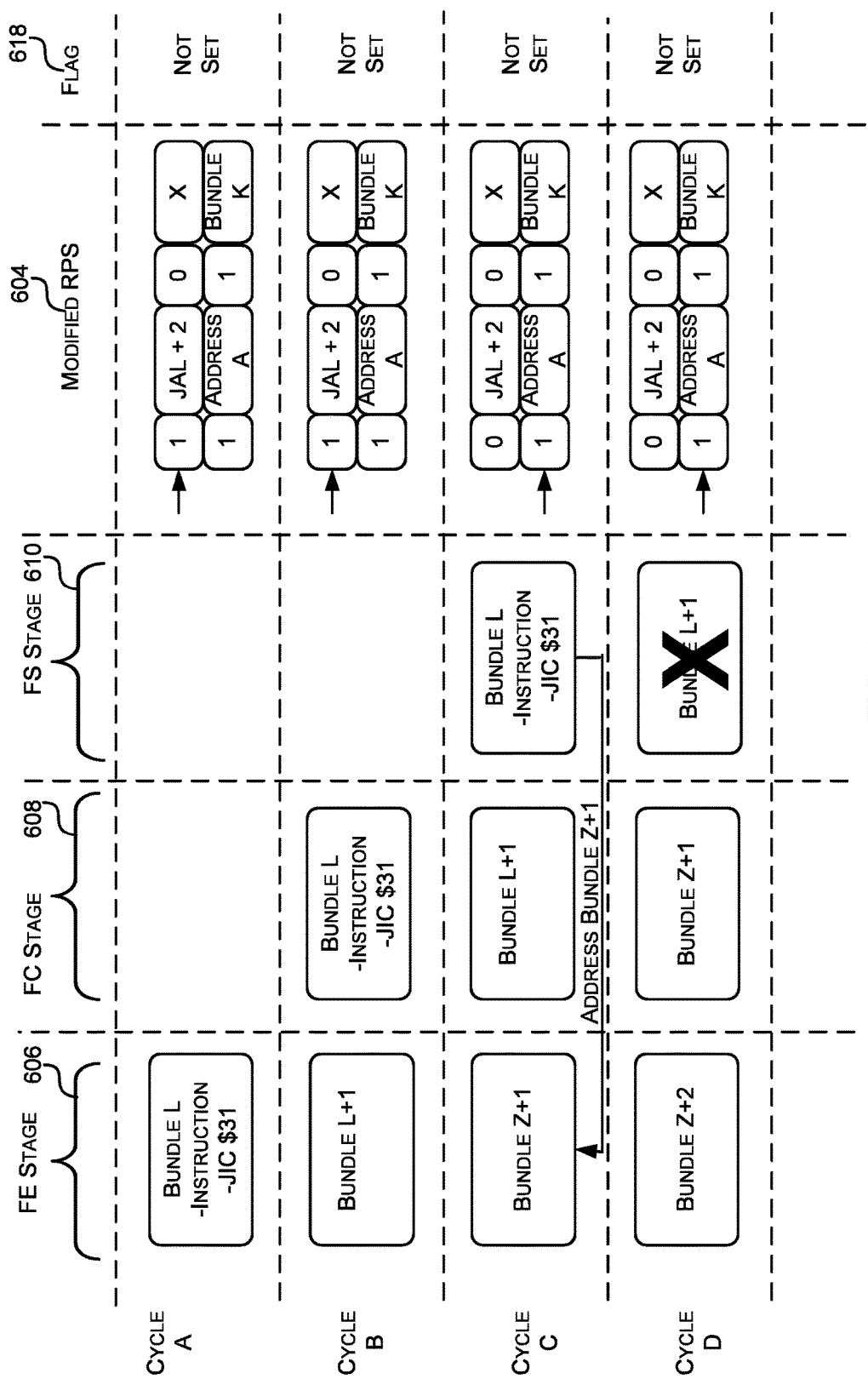
FIG. 14 is a timing diagram of the status of the modified fetch unit of FIG. 6 over a number of cycles when the method of FIG. 12 is used.

Reference is now made to FIGS. 13 and 14 which illustrate example timing diagrams which show the status of the modified fetch unit 602 of FIG. 6 over several cycles when the method 1200 of FIG. 12 is used to pop data from the modified RPS 604. In particular, FIG. 13 shows the status of the modified fetch unit 602 as a subroutine return instruction with the specific form and for which a target instruction bundle has been stored moves through the fetch pipeline; and FIG. 14 shows the status of the modified fetch unit as a subroutine return instruction with the specific form for which a target instruction bundle has not been stored moves through the fetch pipeline. In the examples of FIGS. 13 and 14 each instruction bundle comprises two instructions.

Referring first to the example of FIG. 13, in the first cycle (cycle A) the FE stage 606 sets the program counter (PC) to the address of instruction bundle J which includes a JR $31 instruction (which is a non-compact subroutine return instruction) followed by a delay slot instruction. In the second cycle (cycle B) the FE stage 606 increments the PC to point to the next instruction bundle, instruction bundle J+1, and the FC stage 608 fetches instruction bundle J.

In the third cycle (cycle C) the FC stage fetches instruction bundle J+1 and the FS stage 610 decodes instruction bundle J. Since instruction bundle J comprises a subroutine return instruction (the JR $31 instruction) and the instruction bundle is of a specific form (the subroutine instruction is a non-compact subroutine return instruction and the corresponding delay slot instruction is in the same instruction bundle) the FS stage 610 determines whether the modified RPS 604 comprises a valid target address and a valid target bundle in the top entry. Since it does (both valid bits are set) the target address is used to generate the address for the next bundle to be fetched (which is the bundle immediately following the target bundle—bundle Z+2 in this case) which is used by the FE stage 606 to set the PC to this address; and the target bundle from the modified RPS 604 (instruction bundle Z in this example) is output to an instruction memory module 619 so it can be used by the FS stage 610 in the next cycle.

In particular, in the fourth cycle (cycle D) the FS stage 610 decodes the target instruction bundle stored in the instruction memory module 619 (instruction bundle Z+1 in this case).

Accordingly, it can be seen that in this example, in response to detecting a subroutine return instruction, both the predicted target address and predicted instruction bundle are popped from modified RPS 604. The predicted target address is used to generate the address of the next instruction bundle to fetch and the predicted target instruction bundle is used by the FS stage 610 in the following cycle. It can be seen that in this example the CTI bubble caused by the subroutine return instruction has been eliminated.

Referring now to the example of FIG. 14, in the first cycle (cycle A) the FE stage 606 sets the program counter (PC) to the address of instruction bundle L which includes an instruction followed by a JIC $31 instruction (which is a compact subroutine return instruction). In the second cycle (cycle B) the FE stage 606 increments the PC to point to the next instruction bundle, instruction bundle L+1, and the FC stage 608 fetches instruction bundle L.

In the third cycle (cycle C) the FC stage fetches instruction bundle L+1 and the FS stage 610 decodes instruction bundle L. Since instruction bundle L comprises a subroutine return instruction (the JIC $31 instruction) and the instruction bundle is of a specific form (the subroutine instruction is a compact subroutine return instruction) the FS stage 610 determines whether the modified RPS 604 comprises a valid target address and a valid target bundle in the top entry. Since the modified RPS 604 only includes a valid target address the target address is used to generate the address of the next bundle to be executed (which is instruction bundle Z+1 in this case) which is used by the FE stage 606 to set the PC to this address.

In the fourth cycle (cycle D), the FC stage 608 fetches instruction bundle Z+1 and the FS stage 610 discards instruction bundle L+1 since it is no longer the next instruction bundle to be executed.

Accordingly, it can be seen that in this example, in response to detecting a subroutine return instruction only the predicted target address is popped from modified RPS 604. The predicted target address is used to generate the address of the next bundle to fetch, and the FS stage 610 must wait one cycle to receive the next instruction bundle to decode.

Figure 15:
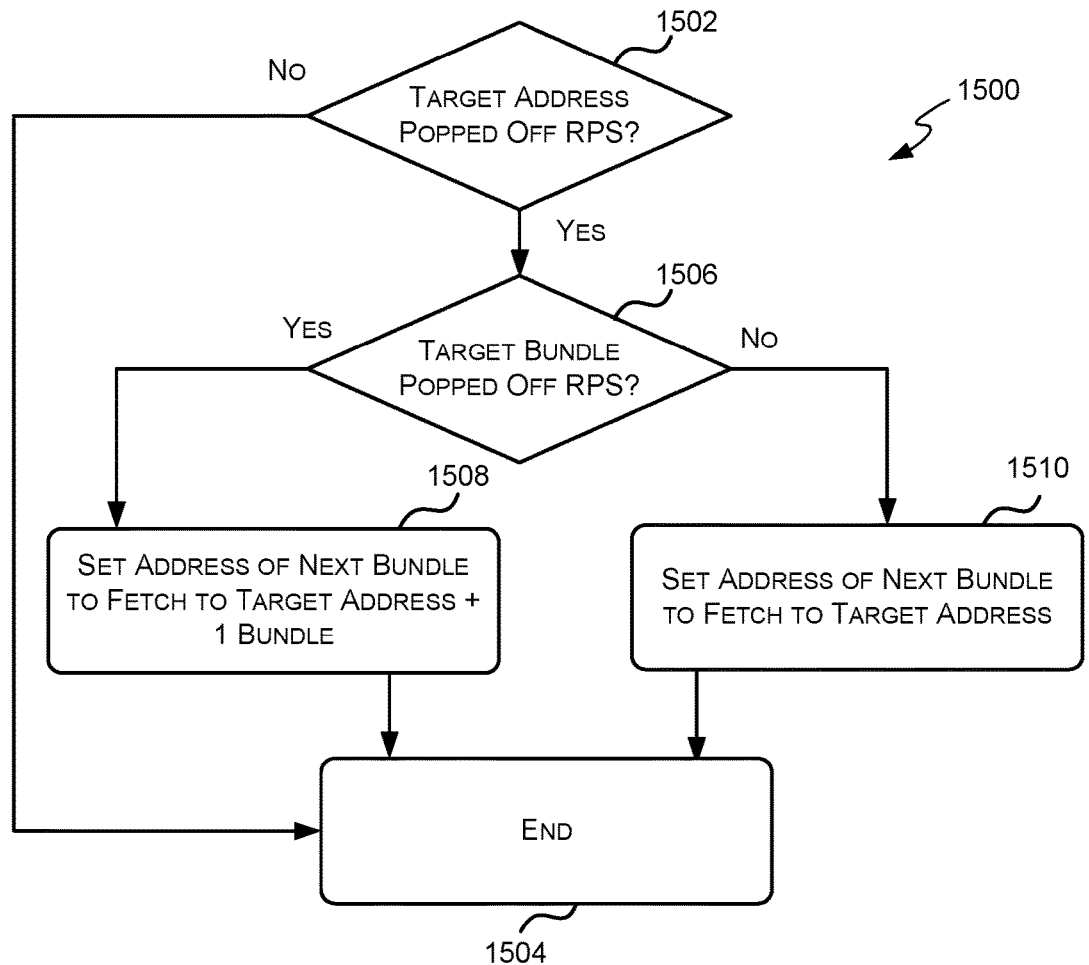
FIG. 15 is a flow diagram of an example method for determining the address of the next instruction bundle to be fetched.

Reference is now made to FIG. 15 which illustrates an example method 1500 for implementing block 806 of method 800 of FIG. 8. In particular, method 1500 is an example method for generating the address of the next instruction bundle to be fetched when a predicted target address is popped off the modified RPS 604 which may be executed by the next bundle logic 620 each cycle.

The method 1500 begins at block 1502 where the next bundle logic 620 determines whether a target address was popped off the modified RPS 604. The next bundle logic 620 may be configured to determine whether a target address was popped off the modified RPS 604 if it receives a target address from the modified RPS 604. If the next bundle logic 620 determines that a target address was not popped off the modified RPS 604 then the method 1500 ends 1504. If, however, the next bundle logic 620 determines that a target address was popped off the modified RPS 604 then the method 1500 proceeds to block 1506.

At block 1506, the next bundle logic 620 determines whether a target instruction bundle was also popped off the modified RPS 604. The next bundle logic 620 may be configured to receive a notification from the modified partial decode logic 616 that a target instruction bundle has been popped and thus may determine that a target instruction was also popped off the modified RPS 604 when such a notification is received. In other cases the next bundle logic 620 may be configured to read the instruction memory module 619 to see if it contains valid data. If the next bundle logic 620 determines that a target instruction bundle was popped off the modified RPS 604 then the method 1500 proceeds to block 1508. If however, the next bundle logic 620 determines that a target instruction bundle was not popped off the modified RPS 604 then the method 1500 proceeds to block 1510.

At block 1508, the next bundle logic 620 sets the address of the next bundle to be fetched to the instruction bundle after the target instruction bundle. For example, the next bundle logic 620 may set the address of the next bundle to be fetched to the predicted target address popped off the modified RPS 604 plus an offset. In particular, if a predicted target bundle was popped off the modified RPS 604 then next bundle to be decoded and executed is already available thus the FC stage 608 can go straight to fetching the next instruction bundle after the predicted target instruction bundle. Once the next bundle logic 620 sets the address the method 1500 ends 1504.

At block 1510, the next bundle logic 620 sets the address of the next bundle to be fetched to the address of the target bundle. For example, the next bundle logic 620 may set the address of the next bundle to be fetched to the predicted target address popped off the modified RPS 604. In particular, since the target bundle is not immediately available to be decoded and executed it must be fetched by the FC stage 608 in the next cycle. Once the next bundle logic 620 sets the address the method 1500 ends 1504.

Figure 16:
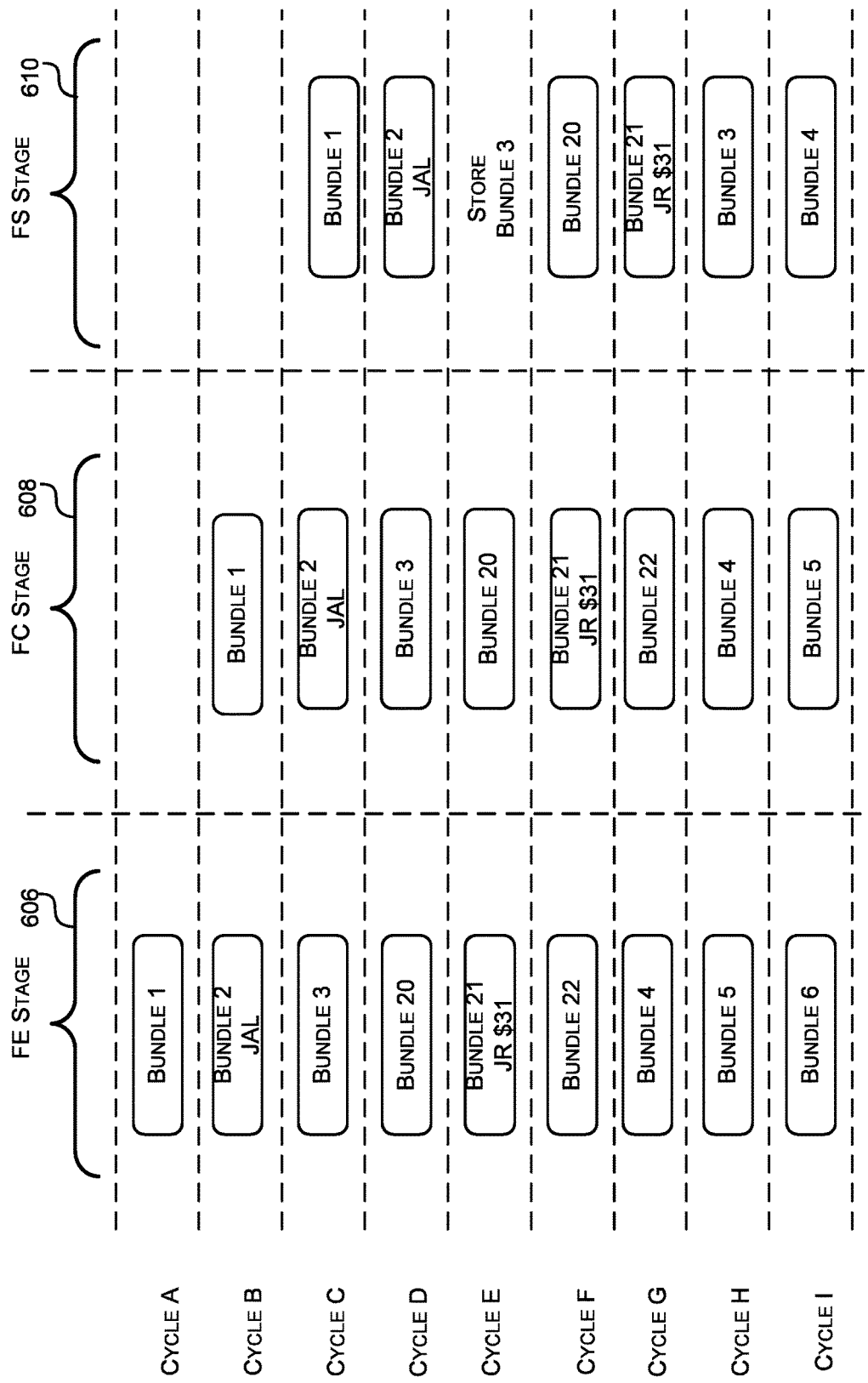
FIG. 16 is a timing diagram of the status of the modified fetch unit of FIG. 6 over a number of cycles.

Reference is now made to FIG. 16 which shows an example timing diagram illustrating the status of the modified fetch unit 602 of FIG. 6 over several cycles. Like the timing diagram of FIG. 5, the timing diagram of FIG. 16 shows which instruction bundle the output of each stage of the modified fetch unit 602 relates to in a particular cycle. For example, in cycle A the output of the FE stage 606 (e.g. the index/PC) relates to instruction bundle 1.

Accordingly, in cycle A the FE stage 606 sets the PC to the address of instruction bundle 1. In cycle B the FE stage 606 sets the PC to the address of the next instruction bundle (e.g. instruction bundle 2) and the FE stage 608 fetches instruction bundle 1. In cycle C the FE stage 606 sets the PC to the address of the next instruction bundle (e.g. instruction bundle 3), the FC stage 608 fetches instruction bundle 2, and the FS stage 610 decodes instruction bundle 1. Accordingly in cycles A, B and C instructions are fetched in sequential order.

In cycle D, however, the FS stage 610 detects a subroutine call and link instruction (e.g. JAL instruction). In response the FS stage 610 predicts the target address of the corresponding subroutine return instruction and pushes it onto the modified RPS 604. Also, if the conditions are met for storing the next instruction bundle in the modified RPS 604 (e.g. the next instruction bundle is predicted to be the target instruction bundle, and the FC stage 608 is active) then the FS stage 610 indicates to the FS stage 610, by for example setting the flag 618, that in the following cycle the received instruction bundle should be pushed onto the modified RPS 604.

Then in cycle E the FS stage 610 sees the flag is set and stores instruction bundle 3 in the modified RPS 604 as the predicted target instruction bundle data and clears the flag 618.

Then in cycle G when the FS stage 610 detects the corresponding subroutine return instruction (e.g. JR $31 instruction), the FS stage 610 pops the stored predicted target instruction bundle (e.g. instruction bundle 3) which is decoded by the FS stage 610 in the next cycle (cycle H) and pops the stored predicted target address which is used to generate the address of the next instruction bundle to be fetched (instruction bundle 4 in this case).

In some cases an instruction bundle may be updated or invalidated after it has been saved or pushed onto the modified RPS 604. Accordingly, in some cases the fetch unit 602 may also comprise an RPS controller that monitors changes to instruction bundles in the instruction cache and updates the modified RPS 604 accordingly. For example, in some cases the RPS controller may be configured to automatically invalidate a predicted target instruction bundle in the modified RPS 604 (e.g. clear the bundle valid data) if the RPS controller detects a change to the corresponding entry in the instruction cache.

Figure 17:
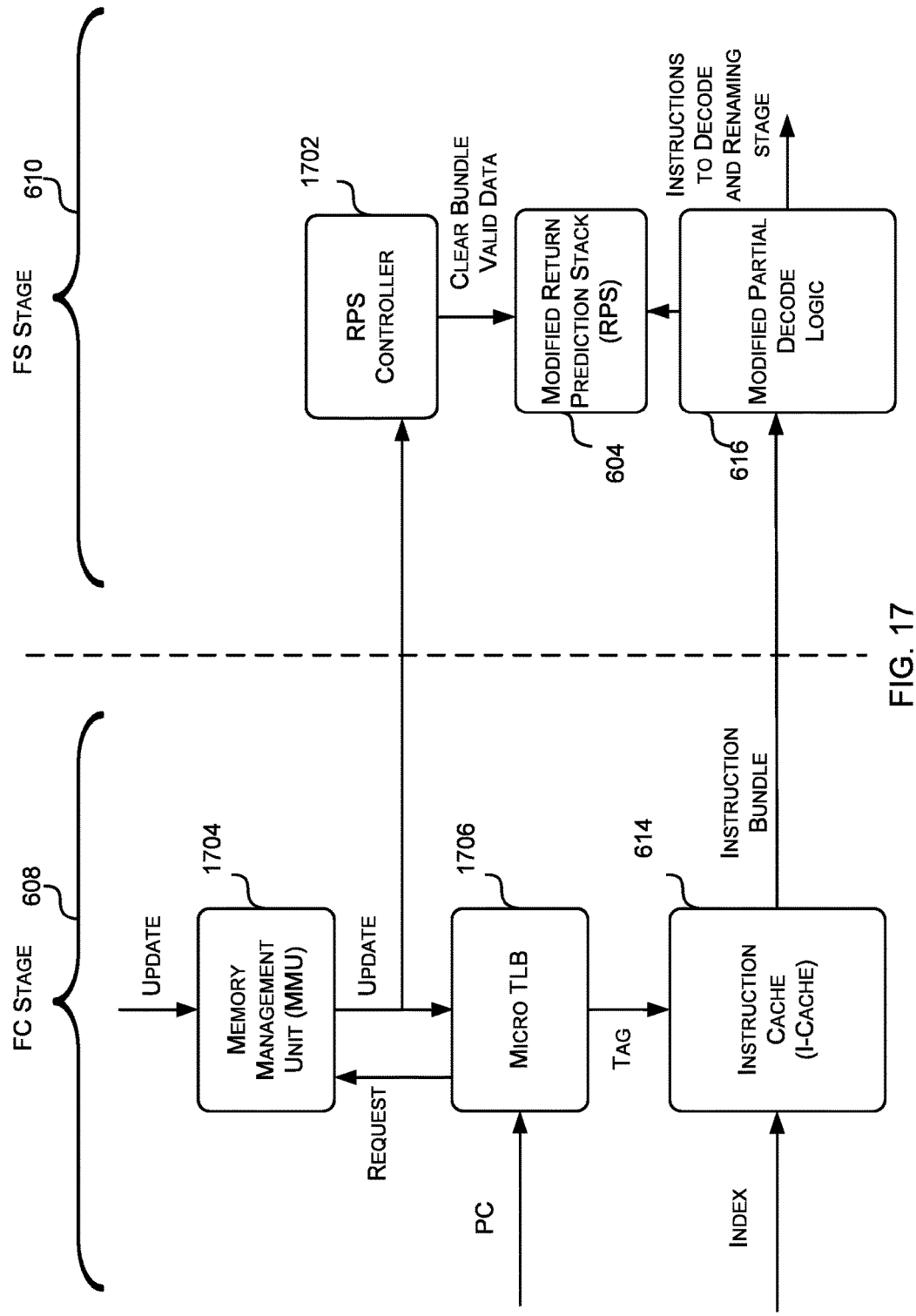
FIG. 17 is a block diagram of an example FS stage of the fetch unit of FIG. 6 with an RPS controller.

Reference is now made to FIG. 17 which shows an example FS stage 610 of a fetch unit which includes an RPS controller 1702. For simplicity not all of the components of the fetch unit 602 of FIG. 6 are shown in FIG. 17, but it will be evident that the RPS controller 1702 described herein may be used as part of the FS stage 610 of the fetch unit 602 of FIG. 6.

A processor does not typically have enough memory to store an entire program so a memory management unit (MMU) is used to map the virtual address of instructions (the address used by the processor—e.g. the PC) to physical memory addresses. When the instruction cache 614 is searched in the FC stage 608 for the instruction bundle corresponding to the PC the instruction cache 614 may be searched using both the index (which is generated from the PC) and a tag (which is generated from the physical address).

To reduce the number of times the MMU 1704 is accessed the FC stage 608 may maintain a micro translation lookaside buffer (TLB) 1706 which is used to cache a predetermined number of virtual address to physical address mappings. In these cases it is then the micro TLB 1706 that is used to generate the tag for the instruction cache lookups.

To ensure that the data in the micro TLB 1706 is kept up to date the MMU 1704 keeps track of the entries in the micro TLB 1706. When the MMU 1704 receives an update (e.g. a change or invalidation of an entry) for one of the entries in the micro TLB 1706 it sends a corresponding update to the micro TLB 1706. The micro TLB 1706 then updates the instruction cache if appropriate.

The RPS controller 1702 may be configured to monitor the updates sent from the MMU 1704 to the micro TLB 1706 to determine if they relate to one of the instruction bundle entries in the modified RPS 604. Since the entries in the micro TLB 1706 are identified by virtual address (e.g. index) and physical address (e.g. tag) in some cases the modified partial decode logic 616 may be configured to also store the tag in the modified RPS 604. In these cases the RPS controller 1702 can definitively determine that an update to the micro TLB 1706 corresponds to a target instruction bundle entry in the RPS if the index and tag specified in the update match a stored index (determined from the predicted target address) and the stored tag. In other cases the tag is not stored in the modified RPS 604. In these cases the RPS controller 1702 may determine that an update to the micro TLB 1706 might correspond to an entry in the RPS if the index in the update matches a stored index (which can be determined from the predicted target address).

If the RPS controller 1702 detects that an update sent from the MMU 1704 to the micro TLB 1706 relates or might relate to an entry in the modified RPS 604 then the RPS controller 1702 may invalidate the target bundle data by setting the bundle valid data 708 to indicate the target bundle data 710 is not valid (e.g. this may involve clearing the bundle valid bit).

Since the micro TLB 1706 has a limited number of entries, if it receives a request for a translation (e.g. to generate a tag) and it doesn't have a corresponding entry then it requests the entry from the MMU 1704 and the MMU 1704 sends the data for the requested entry which is used to refill, replace or evict the least recently used entry in the micro TLB 1706. In some cases, when the RPS controller 1702 detects a refill signal or command from the MMU 1704 the RPS controller 1702 may be configured to invalidate all the target bundle data stored in the modified RPS 604. In other cases, the modified partial decode logic 616 may be configured to store the slot or entry number of the corresponding entry in the micro TLB 1706 for each entry and only when that specific slot is refilled or evicted is the corresponding target bundle data invalidated.

Generally when a virtual address is re-mapped to another physical address the MMU invalidates/updates the corresponding entry in the micro TLB and the instruction cache; and then the instruction bundle data at the new address will subsequently have to be fetched. As described above, when the example RPS controller 1702 detects a change to an entry in the micro TLB that corresponds to an entry in the RPS, the RPS controller 1702 invalidates the corresponding entry in the RPS and does not attempt to update the entry in the RPS with the new instruction bundle data. This is because the instruction bundle at the new address has to be fetched anyways and thus no time is saved by storing it when it is fetched.

It will be evident to a person of skill in the art that the above description of the RPS controller 1702 is an example only and that the RPS controller 1702 may be configured in other ways to monitor updates to instruction bundles and update the RPS 604 accordingly.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein. For example, a non-transitory computer readable storage medium may have stored thereon computer readable instructions that, when processed at a computer system for generating a manifestation of an integrated circuit, cause the computer system to generate a manifestation of a processor comprising a fetch unit as described in the examples herein or to generate a manifestation of a processor configured to perform a method as described in the examples herein. The manifestation of a processor could be the processor itself, or a representation of the processor (e.g. a mask) which can be used to generate the processor.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A multi-stage fetch unit for use in a processor, the multi-stage fetch unit comprising:
   a return prediction stack storing a predicted target set of one or more instructions;
   partial decode logic in communication with the return prediction stack, the partial decode logic configured to, in a cycle:
   receive a set of one or more instructions for execution;
   at least partially decode the received set of one or more instructions to determine whether the received set of one or more instructions comprises a subroutine call and link instruction or a subroutine return instruction;
   in response to determining that the received set of one or more instructions comprises a subroutine call and link instruction, cause a predicted target set of one or more instructions for a corresponding subroutine return instruction to be stored in the return prediction stack; and
   in response to determining that the received set of one or more instructions comprises a subroutine return instruction, cause said predicted target set of one or more instructions stored in the return prediction stack to be the received set of one or more instructions in a next cycle; and
   an instruction memory module; and wherein the partial decode logic is configured to cause a predicted target set of one or more instructions stored in the return prediction stack to be the received set of one or more instructions in the next cycle by storing the predicted target set of one or more instructions in the instruction memory module.

2. The fetch unit of claim 1, wherein the partial decode logic is further configured to, in response to determining that the received set of one or more instructions comprises a subroutine call and link instruction, predict a target address for the corresponding subroutine return instruction and store the predicted target address in the return prediction stack.

3. The fetch unit of claim 2, wherein the partial decode logic is configured to cause the predicted target set of one or more instructions for the corresponding subroutine return instruction to be stored in the return prediction stack by:
   determining whether the predicted target set of one or more instructions is a set of one or more instructions immediately following the received set of one or more instructions; and
   in response to determining that the predicted target set of one or more instructions is the set of one or more instructions immediately following the received set of one or more instructions, causing the received set of one or more instructions in a next cycle to be stored in the return prediction stack.

4. The fetch unit of claim 3, wherein the partial decode logic is further configured to determine whether a cache stage of the fetch-unit is fetching a set of one or more instructions in the current cycle; and the partial decode logic only causes the received set of one or more instructions in the next cycle to be stored in the return prediction stack if it is determined that the cache stage of the fetch unit is fetching a set of one or more instructions in the current cycle.

5. The fetch unit of claim 3, wherein the partial decode logic is configured to determine whether the predicted target set of one or more instructions is a set of one or more instructions immediately following the received set of one or more instructions based on a format of the received set of one or more instructions.

6. The fetch unit of claim 3, wherein the partial decode logic is configured to determine whether the predicted target set of one or more instructions is a set of one or more instructions immediately following the received set of one or more instructions based on the predicted target address.

7. The fetch unit of claim 3, further comprising a flag; and wherein the partial decode logic is configured to cause the received set of one or more instructions in the next cycle to be stored in the return prediction stack by setting the flag.

8. The fetch unit of claim 7, wherein the partial decode logic is further configured to determine whether the flag is set, and in response to determining that the flag is set, store the received set of one or more instructions in the return prediction stack.

9. The fetch unit of claim 3, wherein the partial decode logic is configured to cause the predicted target set of one or more instructions for the corresponding subroutine return instruction to be stored in the return prediction stack by further:
   determining whether the predicted target set of one or more instructions is the received set of one or more instructions; and
   in response to determining that the predicted target set of one or more instructions is the received set of one or more instructions, storing the received set of one or more instructions in the return prediction stack.

10. The fetch unit of claim 2, wherein the partial decode logic is configured to cause a predicted target set of one or more instructions stored in the return prediction stack to be the received set of one or more instructions in a next cycle by:
- determining whether the return prediction stack comprises a valid predicted target set of one or more instructions; and
- in response to determining that the return prediction stack comprises a valid predicted target set of one or more instructions, cause the valid predicted target set of one or more instructions in the return prediction stack to be the received set of one or more instructions in the next cycle.

11. The fetch unit of claim 10, further comprising next bundle logic configured to, in response to the partial decode logic determining that the set of one or more instructions comprises a subroutine return instruction, generate an address for a next set of one or more instructions to be fetched based on a predicted target address stored in the return prediction stack.

12. The fetch unit of claim 11, wherein the next bundle logic is configured to:
- in response to the partial decode logic determining that the return prediction stack comprises a valid predicted target set of one or more instructions, generate the address for the next set of instructions to be fetched to be an address offset from the predicted target address stored in the return prediction stack; and in response to the partial decode logic determining that the return prediction stack does not comprise a valid predicted target set of one or more instructions, generate the address for the next set of one or more instructions to be fetched to be the predicted target address stored in the return prediction stack.

13. The fetch unit of claim 1, wherein the partial decode logic is further configured to determine if the instruction memory module comprises a valid set of one or more instructions, and in response to determining that the instruction memory module comprises a valid set of one or more instructions, using the valid set of one or more instructions as the received set of one or more instructions.

14. The fetch unit of claim 1, further comprising a return prediction stack controller configured to monitor updates to sets of one or more instructions in an instruction cache to determine if the updates affect one or more predicted target sets of one or more instructions stored in the return prediction stack; and in response to determining that an update affects one or more predicted target sets of one or more instructions stored in the return prediction stack, invalidate the one or more predicted sets of one or more instructions stored in the return prediction stack.

15. The fetch unit of claim 1, wherein the received set of one or more instructions is an instruction bundle comprising two or more instructions.

16. A non-transitory computer readable storage medium having stored thereon computer readable program instructions that, when processed at a computer system cause the computer system to generate a representation of a processor comprising the fetch unit as set forth in claim 1.

17. A method of fetching instructions in a multi-stage fetch unit of a processor, the method comprising, in a cycle:
- receiving a set of one or more instructions for execution;
- at least partially decoding the received set of one or more instructions to determine whether the received set of one or more instructions comprises a subroutine call and link instruction or a subroutine return instruction;
- in response to determining that the received set of one or more instructions comprises a subroutine call and link instruction, causing a predicted target set of one or more instructions for a corresponding subroutine return instruction to be stored in a return prediction stack; and
- in response to determining that the received set of one or more instructions comprises a subroutine return instruction, causing a predicted target set of one or more instructions stored in the return prediction stack to be the received set of one or more instructions in a next cycle, wherein causing a predicted target set of one or more instructions stored in the return prediction stack to be the received set of one or more instructions in a next cycle comprises storing the predicted target set of one or more instructions in an instruction memory module.

18. A non-transitory computer readable storage medium having stored thereon computer readable program instructions configured to perform the following steps in a cycle when the instructions are run on a computer:
- receive a set of one or more instructions for execution;
- at least partially decode the received set of one or more instructions to determine whether the received set of one or more instructions comprises a subroutine call and link instruction or a subroutine return instruction;
- in response to determining that the received set of one or more instructions comprises a subroutine call and link instruction, cause a predicted target set of one or more instructions for a corresponding subroutine return instruction to be stored in a return prediction stack; and
- in response to determining that the received set of one or more instructions comprises a subroutine return instruction, cause a predicted target set of one or more instructions stored in the return prediction stack to be the received set of one or more instructions in a next cycle, wherein causing a predicted target set of one or more instructions stored in the return prediction stack to be the received set of one or more instructions in a next cycle comprises storing the predicted target set of one or more instructions in an instruction memory module.

* * * * *